United States Patent
Zhu et al.

(10) Patent No.: US 12,500,836 B2
(45) Date of Patent: Dec. 16, 2025

(54) ROUTING RULE CONFIGURATION METHOD AND COMMUNICATIONS APPARATUS

(71) Applicant: Huawei Technologies Co., Ltd., Shenzhen (CN)

(72) Inventors: Qianghua Zhu, Beijing (CN); Wenfu Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 705 days.

(21) Appl. No.: 17/520,115

(22) Filed: Nov. 5, 2021

(65) Prior Publication Data

US 2022/0060970 A1    Feb. 24, 2022

Related U.S. Application Data

(63) Continuation of application No. PCT/CN2020/088832, filed on May 6, 2020.

(30) Foreign Application Priority Data

May 7, 2019   (CN) .......................... 201910377534.9

(51) Int. Cl.
*H04L 45/302*    (2022.01)
*H04L 41/0894*   (2022.01)
(Continued)

(52) U.S. Cl.
CPC ........ *H04L 45/302* (2013.01); *H04L 41/0894* (2022.05); *H04W 40/02* (2013.01);
(Continued)

(58) Field of Classification Search
CPC . H04L 41/0894; H04L 45/302; H04L 45/566; H04L 47/125; H04L 47/24;
(Continued)

(56) References Cited

U.S. PATENT DOCUMENTS 11,178,592 B2 * 11/2021 Talebi Fard ........ H04W 40/246
11,197,232 B2 * 12/2021 Ryu ...................... H04W 48/08
(Continued)

FOREIGN PATENT DOCUMENTS

| CN | 102318232 A | 1/2012 |
|----|-------------|--------|
| CN | 108512878 A | 9/2018 |
| WO | 2008153302 A2 | 12/2008 |

OTHER PUBLICATIONS

U.S. Appl. No. 62/822,433 (Year: 2019).*
(Continued)

*Primary Examiner* — Dung B Huynh
(74) *Attorney, Agent, or Firm* — Conley Rose, P.C.

(57) ABSTRACT

A routing rule configuration method and a communications apparatus are provided, where after receiving a PDU session establishment request from a first terminal, a session management function network element generates, based on first information including information used to indicate to forward a data packet through an N6 interface, a routing rule used to indicate to send the data packet of a 5G LAN group to which the first terminal belongs to the N6 interface or discard the data packet. The session management function network element can determine a routing rule for an N6-based forwarding manner based on the first information.

24 Claims, 11 Drawing Sheets

(51) Int. Cl.
*H04W 40/02* (2009.01)
*H04W 40/24* (2009.01)
*H04W 40/30* (2009.01)
*H04W 80/02* (2009.01)

(52) U.S. Cl.
CPC ......... *H04W 40/246* (2013.01); *H04W 40/30* (2013.01); *H04W 80/02* (2013.01)

(58) Field of Classification Search
CPC ... H04W 40/02; H04W 40/246; H04W 40/30; H04W 80/02
See application file for complete search history.

(56) References Cited

U.S. PATENT DOCUMENTS

| | | | |
|---|---|---|---|
| 11,317,374 B2* | 4/2022 | Ryu | H04W 8/08 |
| 11,375,575 B2* | 6/2022 | Liu | H04W 80/04 |
| 11,463,280 B2* | 10/2022 | Xu | H04L 49/354 |
| 11,490,291 B2* | 11/2022 | Talebi Fard | H04W 36/08 |
| 11,832,104 B2* | 11/2023 | Liao | H04L 63/20 |
| 11,877,326 B2* | 1/2024 | Liu | H04W 76/10 |
| 11,979,798 B2* | 5/2024 | Talebi Fard | H04W 8/186 |
| 11,991,761 B2* | 5/2024 | Talebi Fard | H04L 47/801 |
| 12,149,444 B2* | 11/2024 | Zhu | H04L 45/742 |
| 2008/0311926 A1 | 12/2008 | Fischer et al. | |
| 2019/0007500 A1* | 1/2019 | Kim | H04L 67/141 |
| 2019/0059067 A1* | 2/2019 | Lee | H04L 67/141 |
| 2019/0109823 A1* | 4/2019 | Qiao | H04M 15/8228 |
| 2019/0124572 A1* | 4/2019 | Park | H04W 80/10 |
| 2019/0386894 A1 | 12/2019 | Hu et al. | |
| 2020/0059761 A1* | 2/2020 | Li | H04W 4/24 |
| 2020/0059992 A1* | 2/2020 | Skog | H04L 45/38 |
| 2020/0145876 A1* | 5/2020 | Dao | H04L 12/1407 |
| 2020/0146077 A1* | 5/2020 | Li | H04W 76/10 |
| 2020/0170071 A1* | 5/2020 | Mildh | H04W 80/08 |
| 2020/0205208 A1* | 6/2020 | Hu | H04W 8/26 |
| 2020/0228936 A1* | 7/2020 | Talebi Fard | H04W 4/08 |
| 2020/0267085 A1* | 8/2020 | Nie | H04L 12/4625 |
| 2020/0267785 A1* | 8/2020 | Talebi Fard | H04W 40/248 |
| 2020/0329008 A1* | 10/2020 | Dao | H04L 61/5007 |
| 2020/0336937 A1* | 10/2020 | Youn | H04W 76/12 |
| 2020/0344204 A1* | 10/2020 | Nie | H04L 61/5007 |
| 2020/0351980 A1* | 11/2020 | Talebi Fard | H04W 76/40 |
| 2020/0351984 A1* | 11/2020 | Talebi Fard | H04W 4/08 |
| 2020/0396779 A1* | 12/2020 | Yang | H04M 15/66 |
| 2021/0006345 A1* | 1/2021 | Zhu | H04W 76/12 |
| 2021/0014765 A1* | 1/2021 | Shan | H04W 8/02 |
| 2021/0044454 A1* | 2/2021 | Xu | H04L 49/351 |
| 2021/0099943 A1* | 4/2021 | Dannebro | H04W 36/0011 |
| 2021/0127271 A1* | 4/2021 | Wu | H04W 12/0471 |
| 2021/0184875 A1* | 6/2021 | Qiao | H04M 15/66 |
| 2021/0212083 A1* | 7/2021 | Jimenez Cordon | H04W 4/80 |
| 2021/0219357 A1* | 7/2021 | Talebi Fard | H04W 48/16 |
| 2021/0250192 A1* | 8/2021 | Alonso Franco | H04M 15/66 |
| 2021/0320897 A1* | 10/2021 | Stojanovski | H04W 4/50 |
| 2021/0345113 A1* | 11/2021 | Parron | H04L 12/4675 |
| 2021/0345158 A1* | 11/2021 | Puente Pestaña et al. | H04L 41/052 |
| 2021/0352619 A1* | 11/2021 | Ryu | H04W 68/005 |
| 2022/0060416 A1* | 2/2022 | Zhu | H04L 45/74 |
| 2022/0070736 A1* | 3/2022 | Nazari | H04W 28/0284 |
| 2022/0116814 A1* | 4/2022 | Di Girolamo | H04W 4/027 |
| 2022/0117015 A1* | 4/2022 | DeFoy | H04W 76/11 |
| 2022/0124488 A1* | 4/2022 | Tsiatsis | H04L 12/1818 |
| 2022/0150166 A1* | 5/2022 | Yang | H04L 12/4633 |
| 2022/0167438 A1* | 5/2022 | Shrestha | H04W 76/20 |
| 2022/0182321 A1* | 6/2022 | Landais | H04L 45/74 |
| 2022/0200813 A1* | 6/2022 | Thiebaut | H04L 12/1407 |
| 2022/0210698 A1* | 6/2022 | Ly | H04W 40/22 |
| 2022/0353336 A1* | 11/2022 | Cañete Martínez et al. | H04L 47/24 |

OTHER PUBLICATIONS

U.S. Appl. No. 62/806,996 (Year: 2019).*
U.S. Appl. No. 62/843,132 (Year: 2019).*
U.S. Appl. No. 62/843,110 (Year: 2019).*
S2-1902848 (Year: 2019).*
Huawei, et al., "Support one to many communication for 5GLAN," 3GPP TSG-SA WG2 Meeting #130, S2-1900597, Jan. 21-25, 2019, Kochi, India, 11 pages.
Huawei, et al., "5GLAN communication," 3GPP TSG-SA WG2 Meeting #131, S2-1902005, Feb. 25-Mar. 1, 2019, Santa Cruz, Tenerife, ES, 14 pages.
Huawei, et al., "5GLAN communication," 3GPP TSG-SA WG2 Meeting #131, S2-1902006, Feb. 25-Mar. 1, 2019, Santa Cruz, Tenerife, ES, 20 pages.
Huawei et al., "implementation of 5GLAN related interface," 3GPP TSG-SA WG2 Meeting #132, S2-1903445, Xi"an, China, Apr. 8-12, 2019, 9 pages.
Huawei, et al., "Clarification of use of AF influence in 5GLAN," 3GPP TSG-WG SA2 Meeting #136, S2-1911587, Reno, NV, USA, Nov. 18-22, 2019, 7 pages.
3GPP TS 23.502 V16.0.2, Apr. 2019, "3rd Generation Partnership Project; Technical Specification Group Services and System Aspects; Procedures for the 5G System; Stage 2 (Release 16)," 419 pages.
3GPP TS 23.501 V16.0.2, Apr. 2019, "3rd Generation Partnership Project; Technical Specification Group Services and System Aspects; System Architecture for the 5G System; Stage 2 (Release 16)," 317 pages.

* cited by examiner

ROUTING RULE CONFIGURATION METHOD AND COMMUNICATIONS APPARATUS

CROSS-REFERENCE TO RELATED APPLICATIONS

This is a continuation of International Patent Application No. PCT/CN2020/088832, filed on May 6, 2020, which claims priority to Chinese Patent Application No. 201910377534.9, filed on May 7, 2019. The disclosures of the aforementioned applications are hereby incorporated by reference in their entireties.

TECHNICAL FIELD

This application relates to the field of communications technologies, and in particular, to a routing rule configuration method and a communications apparatus.

BACKGROUND

A 5th generation (5G) mobile communications system local area network (LAN) service is a service provided by a 5G system, and can provide private communication of an Internet Protocol (IP) type or an Ethernet type for terminals belonging to a same 5G virtual network (VN) group. For example, devices in a factory form a 5G VN group, and the devices belonging to the 5G VN group may send Ethernet data packets or IP data packets to each other.

In a 5G LAN, data packets may be transmitted between devices in a 5G VN group in the following three forwarding manners: local forwarding, forwarding across user plane function (UPF) network elements, and N6 interface-based forwarding. However, how to use the three forwarding manners in one 5G VN group is an urgent problem to be resolved.

SUMMARY

Embodiments of this application provide a routing rule configuration method and a communications apparatus, to implement data forwarding in a 5G LAN group using any one of a local forwarding manner, an N19-based forwarding manner, or an N6-based forwarding manner.

According to a first aspect, a routing rule configuration method is provided. In the method, after receiving a protocol data unit (PDU) session establishment request sent by a first terminal, a session management function network element generates, based on first information including information used to indicate to forward a data packet through an N6 interface, a routing rule corresponding to a 5G LAN group to which the first terminal belongs, where the routing rule is used to indicate to send the data packet to the N6 interface or discard the data packet; and then the session management function network element configures the routing rule on a first UPF network element included in the 5G LAN group.

In the foregoing technical solution, the session management function network element can determine a routing rule for an N6-based forwarding manner based on the first information. Therefore, when the session management function network element in the conventional technology can already determine, based on whether anchor UPFs of two sessions are the same, whether to use a local forwarding manner or an N19-based forwarding manner, any one of the local forwarding manner, the N19-based forwarding manner, or the N6-based forwarding manner can be used in a 5G LAN group according to the solution provided in this application. This resolves a problem in the conventional technology that the three forwarding manners cannot be used in a 5G LAN group.

In a possible design, the first information may include but is not limited to the following two cases.

In a first case, the first information is a data routing policy corresponding to the 5G LAN group to which the first terminal belongs, where the data routing policy includes the identifier of the 5G LAN group to which the first terminal belongs and information used to indicate a supported level of an N6-based forwarding manner. The supported level includes a mandatory supported level, a conditional supported level, or an unsupported level, where the mandatory supported level indicates preferentially using the N6-based forwarding manner, where the conditional supported level indicates preferentially using a non-N6-based forwarding manner, and where the non-N6-based forwarding manner includes a manner of forwarding a data packet based on an N19 interface and a manner of forwarding a data packet based on an internal interface of the UPF network element.

In a second case, the first information is a policy and charging control (PCC) rule corresponding to the PDU session and that is obtained from a policy control function network element, and the PCC rule includes a packet filter that supports the N6-based forwarding manner.

In the foregoing technical solution, the session management function network element may determine the routing rule based on different information, which can increase flexibility of the session management function network element.

In a possible design, when the first information is the data routing policy corresponding to the 5G LAN group to which the first terminal belongs, the routing rule may include but is not limited to the plurality of cases described below.

Case A: If the data routing policy includes information used to indicate that the supported level of the N6-based forwarding manner is the mandatory supported level, the routing rule includes a first packet detection rule (PDR) and a first forwarding action rule (FAR) corresponding to the first PDR, where the first PDR includes an address of the first terminal, and where a target interface of the first FAR is set to a value of an interface corresponding to the N6 interface.

Case B: If the data routing policy further includes an identifier of a first data flow that supports the N6-based forwarding manner or an identifier of at least one second terminal that supports the N6-based forwarding manner, a data flow of the first terminal belongs to the first data flow, or the identifier of the at least one second terminal includes an identifier of the first terminal.

Case C: If the data routing policy includes information used to indicate that the supported level of the N6-based forwarding manner is the conditional supported level, the routing rule includes a second PDR and a second FAR corresponding to the second PDR, where a target interface of the second FAR is set to a value of an interface corresponding to the N6 interface, and where the second PDR includes a match-all packet filter.

Case D: If the data routing policy further includes path information for forwarding a data packet in the N6-based forwarding manner, the first FAR or the second FAR includes the path information.

Case E: If the data routing policy includes information used to indicate that the supported level of the N6-based forwarding manner is the unsupported level, the routing rule includes a third PDR and a third FAR corresponding to the third PDR, where the third FAR is used to indicate to discard a data packet matching the third PDR, and where the third PDR includes a match-all packet filter.

The foregoing five cases are used for description. This embodiment of this application is not limited to the foregoing five implementations.

In a possible design, the data routing policy is preconfigured, the data routing policy is obtained from a policy control function network element, the data routing policy is carried in subscription data sent by a unified data management (UDM)/user data repository (UDR), or the data routing policy is carried in application data sent by a network exposure function (NEF).

In the foregoing technical solution, the session management function network element may obtain the data routing policy in a plurality of manners, which can improve applicability of the method.

In a possible design, when the first information is the PCC rule corresponding to the PDU session and that is obtained from the policy control function network element, the routing rule may include but is not limited to the following cases.

Case A: If the packet filter is a filter for detecting a data packet of the first terminal, that is, a filter that includes an address of the first terminal, the routing rule includes a fourth PDR and a fourth FAR corresponding to the fourth PDR, where a filter parameter of the fourth PDR is set to the packet filter, and where the fourth FAR is used to indicate to send a data packet matching the fourth PDR to the N6 interface.

Case B: If the packet filter is a match-all filter, the routing rule includes a fifth PDR and a fifth FAR corresponding to the fifth PDR, where the fifth PDR includes the match-all filter, and where the fifth FAR is used to indicate to send a data packet matching the fifth PDR to the N6 interface.

Case C: If the PCC rule further includes path information for forwarding a data packet in the N6-based forwarding manner, the fourth FAR or the fifth FAR further includes the path information.

Case D: If the PCC rule does not include a packet filter that supports the N6-based forwarding manner, the routing rule includes a sixth PDR and a sixth FAR corresponding to the sixth PDR, where the sixth PDR includes a match-all filter, and where the sixth FAR is used to indicate to discard a data packet matching the sixth PDR.

The foregoing four cases are used for description. This embodiment of this application is not limited to the foregoing four implementations.

In a possible design, the session management function network element may send a first request to the policy control function network element to obtain the PCC rule. The first request includes a data network name (DNN), and/or an identifier of the 5G LAN group to which the first terminal belongs, and/or an identifier of a UPF network element associated with the first terminal, and/or an address/identifier of the first terminal. Then, the session management function network element receives the PCC rule from the policy control function network element.

According to a second aspect, a routing rule configuration method is provided, including: A policy control function network element receives a first request, sent by a session management function network element, that is used to obtain a PCC rule corresponding to a 5G LAN group to which a first terminal belongs, where the first request includes a DNN, and/or an identifier of the 5G LAN group to which the first terminal belongs, and/or an identifier of a UPF network element associated with the first terminal, and/or an address/identifier of the first terminal. Then, the policy control function network element determines, based on the DNN, and/or the identifier of the 5G LAN group to which the first terminal belongs, and/or the identifier of the UPF network element associated with the first terminal, a data routing policy corresponding to the 5G LAN group to which the first terminal belongs. Additionally, the policy control function network element generates the PCC rule according to the data routing policy, and sends the PCC rule to the session management function network element, where the PCC rule includes information used to indicate to forward a data packet through an N6 interface.

In the foregoing technical solution, the policy control function network element generates, according to the data routing policy corresponding to the 5G LAN group, a PCC rule including a packet filter that supports an N6-based forwarding manner, and then sends the PCC rule to the session management function network element. As such, the session management function network element may directly generate a routing rule of the N6-based forwarding manner according to the PCC rule. Therefore, when the session management function network element in the conventional technology can already determine, based on whether anchor UPFs of two sessions are the same, whether to use a local forwarding manner or an N19-based forwarding manner, any one of the local forwarding manner, the N19-based forwarding manner, or the N6-based forwarding manner can be used in a 5G LAN group according to the solution provided in this application. This resolves a problem in the conventional technology that the three forwarding manners cannot be used in a 5G LAN group.

Further, the session management function network element may generate the routing rule of the N6-based forwarding manner according to the PCC rule. This can reduce calculation workload of the session management function network element, and therefore reduce load of the session management function network element.

In a possible design, the data routing policy includes the identifier of the 5G LAN group to which the first terminal belongs and information used to indicate a supported level of the N6-based forwarding manner. The supported level includes a mandatory supported level, a conditional supported level, or an unsupported level, where the mandatory supported level indicates preferentially using the N6-based forwarding manner, where the conditional supported level indicates preferentially using a non-N6-based forwarding manner, and where the non-N6-based forwarding manner includes a manner of forwarding a data packet based on an N19 interface and a manner of forwarding a data packet based on an internal interface of the UPF network element.

The foregoing description of the data routing policy is merely an example, and specific content of the data routing policy is not limited in this embodiment of this application.

In a possible design, the PCC rule may include but is not limited to the plurality of cases described below.

Case A: If the data routing policy includes information used to indicate that the supported level of the N6-based forwarding manner is the mandatory supported level, the PCC rule includes a packet filter used to detect a data packet of the first terminal, that is, a filter that includes an address of the first terminal.

Case B: If the data routing policy further includes an identifier of a first data flow that supports the N6-based forwarding manner or an identifier of at least one second terminal that supports the N6-based forwarding manner, a data flow of the first terminal belongs to the first data flow, or the identifier of the at least one second terminal includes an identifier of the first terminal.

Case C: If the data routing policy includes information used to indicate that the supported level of the N6-based forwarding manner is the conditional supported level, the PCC rule includes a match-all filter.

Case D: If the data routing policy includes information used to indicate that the supported level of the N6-based forwarding manner is the unsupported level, the PCC rule does not include a packet filter.

Case E: If the data routing policy further includes path information for forwarding a data packet in the N6-based forwarding manner, the PCC rule further includes the path information.

The foregoing five cases are used for description. This embodiment of this application is not limited to the foregoing five implementations.

In a possible design, the data routing policy is preconfigured, the data routing policy corresponding to the 5G LAN group to which the first terminal belongs is obtained from a UDM/UDR, or the data routing policy corresponding to the 5G LAN group to which the first terminal belongs is obtained from an NEF or an application function (AF).

In the foregoing technical solution, the policy control function network element may obtain the data routing policy in a plurality of manners, which can improve applicability of the method.

According to a third aspect, a communications apparatus is provided. The communications apparatus includes a processor configured to implement the method performed by the session management function network element in the first aspect. The communication apparatus may further include a memory configured to store program instructions and data. The memory is coupled to the processor, and the processor may invoke and execute the program instructions stored in the memory, to implement any method performed by the session management function network element in the first aspect. The communications apparatus may further include a transceiver, where the transceiver is used for communication between the communications apparatus and another device. For example, the other device is a first UPF network element.

According to a fourth aspect, an embodiment of this application provides a communications apparatus, including: a transceiver unit configured to receive a PDU session establishment request sent by a first terminal; and a processing unit configured to: after receiving the PDU session establishment request sent by the first terminal, generate, based on first information, a routing rule corresponding to a 5G LAN group to which the first terminal belongs, where the first information includes information used to indicate to forward a data packet through an N6 interface, the routing rule is used to indicate to send the data packet to the N6 interface or discard the data packet; and configure the routing rule on a first UPF network element, where the first UPF network element belongs to the 5G LAN group.

In addition, the communications apparatus provided in the fourth aspect may be configured to perform the method corresponding to the session management function network element in the first aspect. For implementations not described in detail in the communications apparatus provided in the fourth aspect, refer to the foregoing embodiments. Details are not described herein again.

According to a fifth aspect, a communications apparatus is provided. The communications apparatus includes a processor configured to implement the method performed by the first policy control function network element in the second aspect. The communication apparatus may further include a memory configured to store program instructions and data. The memory is coupled to the processor, and the processor may invoke and execute the program instructions stored in the memory, to implement any method performed by the policy control function network element in the second aspect. The communications apparatus may further include a transceiver, where the transceiver is used for communication between the communications apparatus and another device. For example, the other device is a session management function network element.

According to a sixth aspect, an embodiment of this application provides a communications apparatus, including a transceiver unit and a processing unit. The transceiver unit is configured to receive a first request sent by a session management function network element, where the first request is used to obtain a PCC rule corresponding to a 5G LAN group to which a first terminal belongs; and the first request includes a DNN, and/or an identifier of the 5G LAN group to which the first terminal belongs, and/or an identifier of a UPF network element associated with the first terminal, and/or an address/identifier of the first terminal. The processing unit is configured to: determine, based on the DNN, and/or the identifier of the 5G LAN group to which the first terminal belongs, and/or the identifier of the UPF network element associated with the first terminal, a data routing policy corresponding to the 5G LAN group to which the first terminal belongs; and generate the PCC rule according to the data routing policy, where the PCC rule includes a packet filter that supports an N6-based forwarding manner. The transceiver unit is further configured to send the PCC rule to the session management function network element.

In addition, the communications apparatus provided in the sixth aspect may be configured to perform the method corresponding to the policy control function network element in the second aspect. For implementations not described in detail in the communications apparatus provided in the sixth aspect, refer to the foregoing embodiments. Details are not described herein again.

According to a seventh aspect, an embodiment of this application further provides a computer-readable storage medium, including instructions. When the instructions are run on a computer, the computer is enabled to perform the method performed by the session management function network element in the first aspect or the method performed by the policy control function network element in the second aspect.

According to an eighth aspect, an embodiment of this application further provides a computer program product, including instructions. When the instructions are run on a computer, the computer is enabled to perform the method performed by the session management function network element in the first aspect or the method performed by the policy control function network element in the second aspect.

According to a ninth aspect, an embodiment of this application provides a chip system. The chip system includes a processor, and may further include a memory configured to implement the method performed by the session management function network element in the first aspect or the method performed by the policy control function network element in the second aspect. The chip system may include a chip, or may include a chip and another discrete component.

According to a tenth aspect, an embodiment of this application provides a communications system, where the system includes the communications apparatuses according to the third aspect and the fifth aspect, or includes the communications apparatuses according to the fourth aspect and the sixth aspect.

For beneficial effects of the third aspect to the tenth aspect and the implementations thereof, refer to the descriptions of beneficial effects of the method according to the first aspect or the second aspect and the implementations thereof.

DESCRIPTION OF EMBODIMENTS

To make objectives, technical solutions, and advantages of embodiments of this application clearer, the following describes the technical solutions in the embodiments of this application in detail with reference to the accompanying drawings and implementations of the specification.

Figure 1:
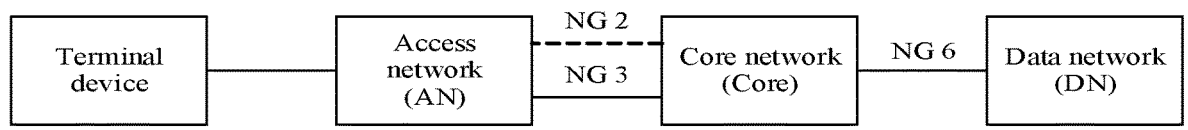
FIG. 1 is a diagram of an example network architecture of a communications system according to this application.

FIG. 1 is a diagram of an example network architecture of a communications system according to this application. Network elements in the network architecture include a terminal, an access network (AN), a core network, and a data network (DN). The access network may be a radio access network (RAN). In the network architecture, the terminal, the AN, and the core are main parts included in the network architecture. Network elements in the AN and the core are logically classified into user plane network elements and control plane network elements. A control plane is responsible for mobile network management, and a user plane is responsible for service data transmission. For example, in the network architecture shown in FIG. 1, an NG 2 reference point is located between a RAN control plane and a core control plane, an NG 3 reference point is located between a RAN user plane and a core user plane, and an NG 6 reference point is located between a core user plane and the DN.

In the network architecture shown in FIG. 1, a terminal is also referred to as terminal equipment, a user equipment (UE), a mobile station (MS), a mobile terminal (MT), or the like. A terminal is a device with a wireless transceiver function, and is an entry for a mobile user to interact with a network. The terminal can provide a basic computing capability and a storage capability, display a service window to the user, and receive an input operation of the user. In a 5G communications system, the terminal establishes a signal connection and a data connection to the AN using a new air interface technology, to transmit a control signal and service data to the network.

The terminal may be deployed on land, including an indoor device, an outdoor device, a handheld device, or an in-vehicle device; or may be deployed on water (for example, on a ship), or may be deployed in the air (for example, on a plane, a balloon, or a satellite). For example, the terminal may include a mobile phone (or referred to as a "cellular" phone), a computer having a mobile terminal, a portable, pocket-sized, handheld, computer-built-in, or in-vehicle mobile apparatus, an intelligent wearable device, or the like. For example, the terminal is a personal communications service (PCS) phone, a cordless telephone set, a Session Initiation Protocol (SIP) phone, a wireless local loop (WLL) station, or a personal digital assistant (PDA).

Alternatively, the terminal may further include a limited device, for example, a device with relatively low power consumption, a device with a limited storage capability, or a device with a limited computing capability. For example, the terminal includes an information sensing device such as a bar code, radio frequency identification (RFID), a sensor, a Global Positioning System (GPS), or a laser scanner.

By way of example and not limitation, in the embodiments of this application, an intelligent wearable device is a generic term for wearable devices such as glasses, gloves, watches, clothes, and shoes that are developed based on intelligent design of daily wearing using wearable technologies. The intelligent wearable device is a portable device that can be directly worn by a user or integrated into clothes or an accessory of a user. The intelligent wearable device is not only a hardware device, but is used to implement powerful functions through software support, data exchange, and cloud interaction. On a broad note, the intelligent wearable device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

Alternatively, the terminal may be a virtual reality (VR) device, an augmented reality (AR) device, a wireless terminal in industrial control, a wireless terminal in self-driving (driverless), a wireless terminal in remote medical surgery, a wireless terminal in a smart grid, a wireless terminal in transportation safety, a wireless terminal in a smart city, a wireless terminal in a smart home, or the like.

In the network architecture shown in FIG. 1, the AN is similar to a (radio) access network ((R)AN) device in a conventional communications network. For example, the AN includes a base station (for example, an access point), and is deployed at a location close to a terminal. This enables an authorized user in specific area to access the network and determines transmission tunnels of different quality to transmit user data based on a user level and a service requirement. The AN can manage and properly utilize its own resources, provide an access service for a terminal on demand, and forward control signals and service data between the terminal and the core.

In the network architecture shown in FIG. 1, the core is responsible for maintaining subscription data of the mobile network, managing network elements in the mobile network, and providing functions such as session management, mobility management, policy management, and security authentication for a terminal. For example, the core provides network access authentication for the terminal when the terminal attaches to the network; allocates network resources to the terminal when the terminal has a service request; updates network resources for the terminal when the terminal moves; provides a fast recovery mechanism for the terminal when the terminal is idle; releases network resources for the terminal when the terminal detaches from the network; provides a data routing function for the terminal when the terminal has service data, for example, forwards uplink data to the DN or receives downlink data from the DN and forwards the data to the AN.

In the network architecture shown in FIG. 1, the DN is a data network that provides a service for a user. In an actual communication process, a client is usually located on the terminal, and a server is usually located on the DN. The DN may be a private network, for example, a LAN, or may be an external network that is not controlled by operators, for example, the Internet, or may be a dedicated network jointly deployed by operators, for example, a network that provides an IP multimedia core network subsystem (IMS) service.

Figure 2:
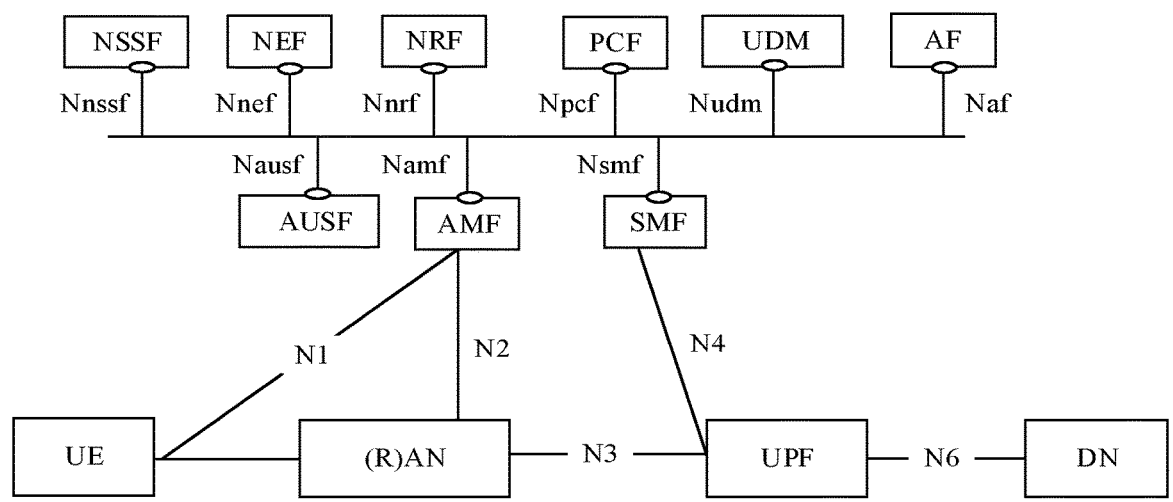
FIG. 2 is a schematic diagram of a network architecture according to this application.

FIG. 2 is a schematic diagram of a network architecture according to this application. The network architecture is a 5G network architecture. Network elements in the 5G architecture include a terminal, a radio access network (RAN), and a data network (DN). In FIG. 2, an example in which the terminal is a user equipment (UE) is used. In addition, the network architecture further includes a core network element, and the core network element includes a UPF network element and a control plane function network element. For example, the control plane function network element includes but is not limited to an access and mobility management function (access and mobility management function, AMF) network element, a session management function (SMF) network element, an authentication server function (AUSF) network element, an application function (AF) network element, a unified data management (UDM) network element, a policy control function (PCF) network element, a network exposure function network element (NEF) network element, a network function (NF), a network repository function (NRF) network element, or a network slice selection function (NSSF) network element.

It should be noted that, in a conventional core network architecture, a point-to-point communication manner is used between control plane function network elements, that is, a set of specific messages is used for interface communication between the control plane function network elements, and control plane function network elements at both ends of an interface can communicate only using the set of specific messages. However, in a 5G core network architecture, a control plane uses a service-oriented architecture, that is, control plane function network elements interact by invoking a service, and the control plane function network element exhibits a service to another control plane function network element for invocation.

The following describes in detail functions of each network element in the network architecture shown in FIG. 2. Because functions of the UE, the (R)AN, and the DN have been described in related descriptions of the network architecture shown in FIG. 1, the following mainly describes the functions of each core network element.

The UPF network element is a function network element on a user plane, and is mainly responsible for connecting to an external network. The UPF network element includes related functions of a serving gateway (SGW) and a packet data network (PDN) gateway (PDN-GW) in Long-Term Evolution (LTE). For example, the UPF may forward a user data packet according to a routing rule of the SMF, for example, send uplink data to the DN or another UPF, or forward downlink data to another UPF or RAN.

The AMF network element is responsible for access management and mobility management of the UE, for example, is responsible for status maintenance of the UE, reachability management of the UE, forwarding of a mobility management (MM) non-access-stratum (MM NAS) message, and forwarding of a session management (SM) N2 message. In actual application, the AMF network element may implement a mobility management function of a mobility management entity (MME) in an LTE network framework, and may further implement an access management function.

The SMF network element is responsible for session management, and allocates or release a resource for a session of the UE. The resource includes quality of service (QOS) of a session, a session path, a routing rule, and the like.

The AUSF network element is configured to perform security authentication on the UE.

The AF network element may be a third-party application control platform, or may be a device deployed by an operator. The AF network element may provide services for a plurality of application servers.

The UDM network element may store subscription information of the UE.

Similar to a policy and charging rules function (PCRF) network element in the LTE, the PCF network element is configured to perform user policy management and is mainly responsible for policy authorization, quality of service, and charging rules generation. In addition, after the SMF network element generates a routing rule based on a corresponding rule, the PCF network element delivers the routing rule to the UPF network element to install corresponding policies and rules.

The NEF network element is configured to exhibit a network function to a third party through northbound application programming interface (API).

The NRF network element is configured to provide a function of storing and selecting network function entity information for another network element.

The NSSF network element is configured to select a network slice for the UE.

In the network architecture shown in FIG. 2, the SMF network element is further configured to perform LAN communication management for the UE in the group.

In the network architecture shown in FIG. 2, network elements related to this application mainly include the UE, the PCF, the UPF, and the SMF.

The following describes an application scenario of this application. This application is mainly applied to a scenario in which a 5G system provides a 5G LAN service.

Figure 3A:
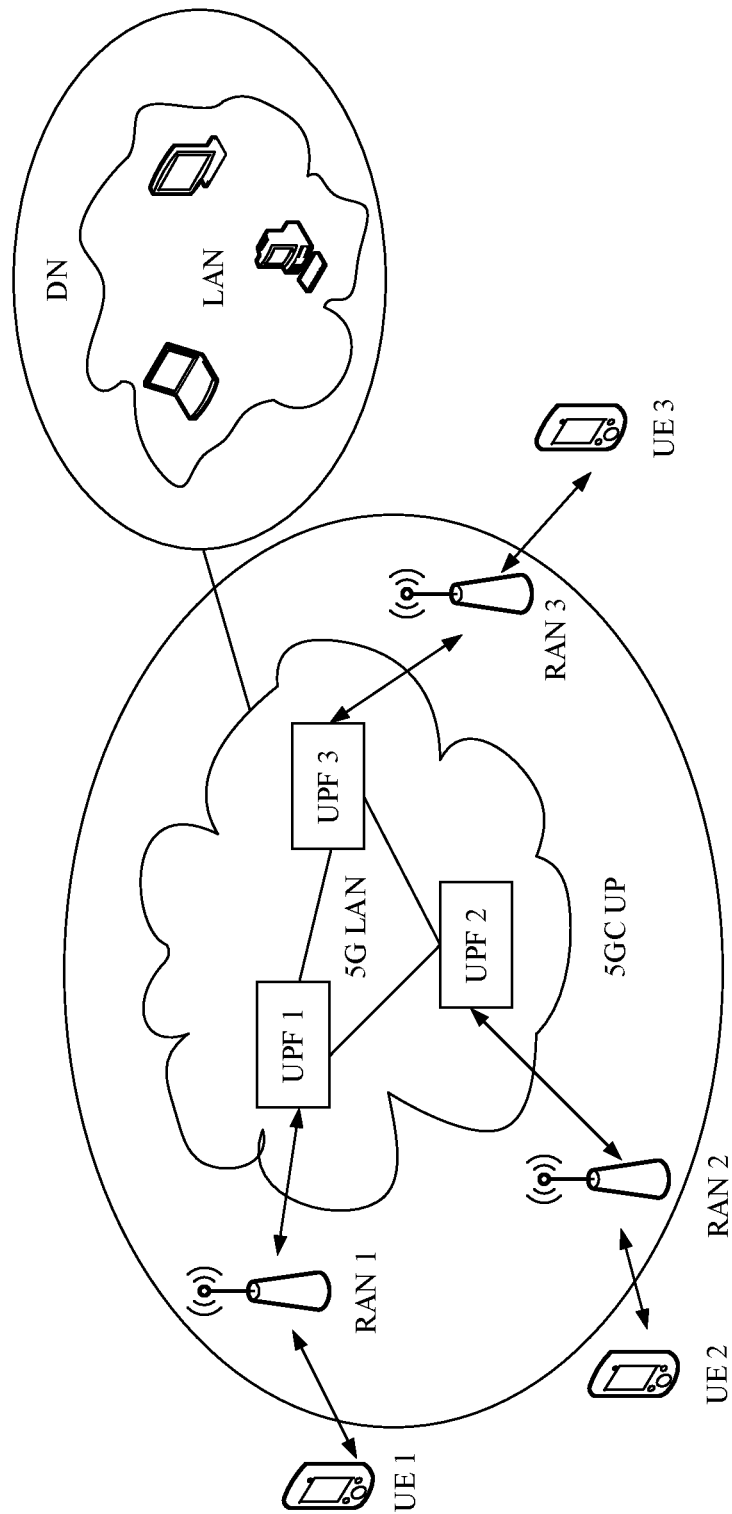
FIG. 3A is a schematic diagram of an example application scenario according to an embodiment of this application.

FIG. 3A is a schematic diagram of an example user plane architecture of a 5G LAN service according to this application. A UPF 1 to a UPF 3 belong to a 5G LAN. A UE 1 to a UE 3 are separately connected to one UPF network element in the 5G LAN through one RAN. For example, the UE 1 is connected to the UPF 1, the UE 2 is connected to the UPF 2, and the UE 3 is connected to the UPF 3. In this way, the UE 1 to the UE 3 access user planes (UPs) in the corresponding 5G LAN through the UPF network elements. For example, the UE 1 to the UE 3 separately access a 5GC UP through the UPF 1 to the UPF 3, and the UE 1 to the UE 3 form a 5G VN group. One UE is located in one 5G LAN (it may alternatively be understood that one UE belongs to one 5G LAN or 5G LAN service, or the UE subscribes to one 5G LAN or 5G LAN service, or the UE is associated with or corresponding to one 5G LAN or 5G LAN service). The user plane in the 5G LAN can communicate with an available LAN in the DN through an N6 interface. Alternatively, the user plane in the 5G LAN may be associated with one or more PDU sessions of different UEs using N19 connections between UPFs (for example, the UPF 1 to the UPF 3) in the 5G LAN, to implement private communication between UEs.

Figure 3B:
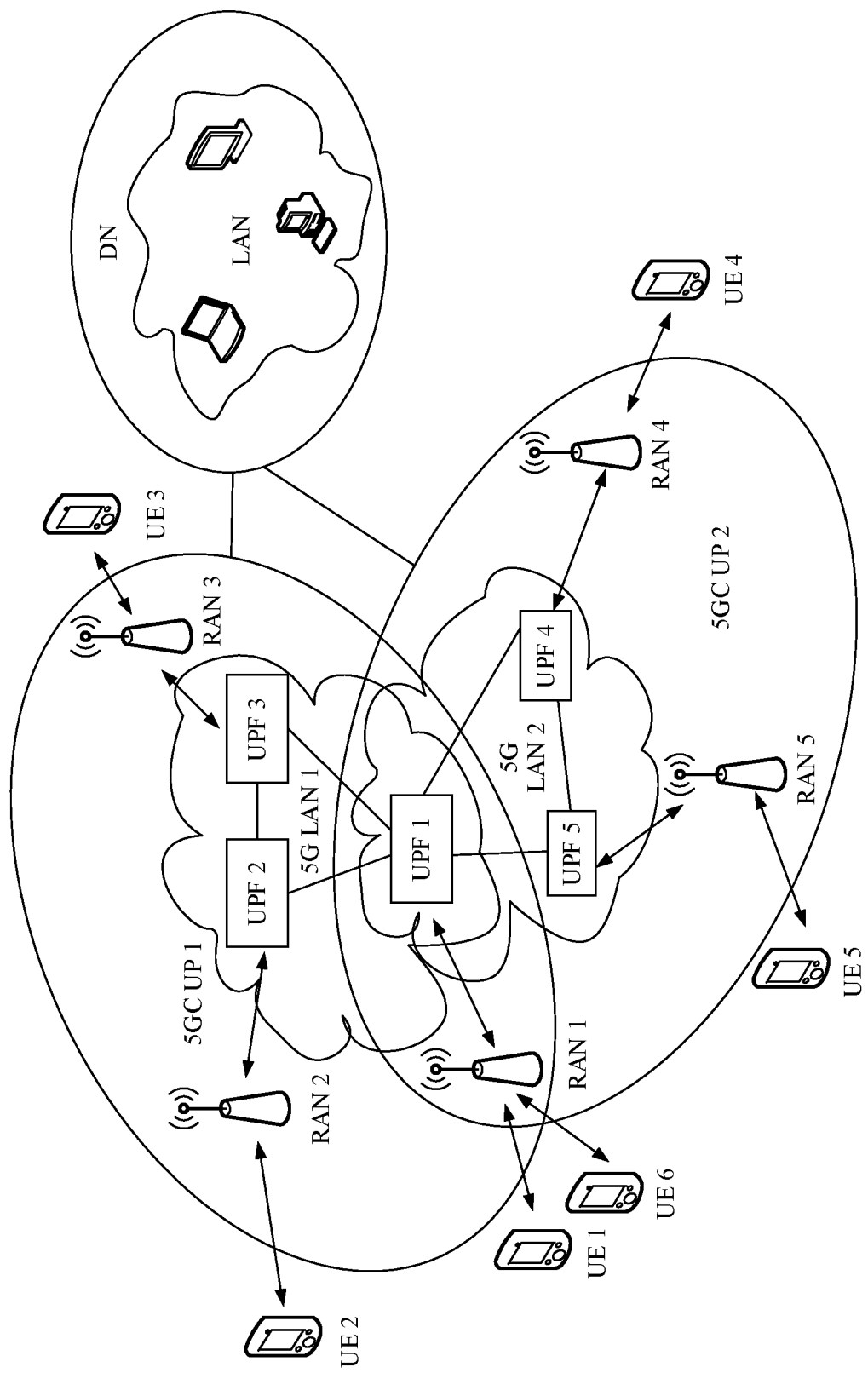
FIG. 3B is a schematic diagram of another example application scenario according to an embodiment of this application.

FIG. 3B is a schematic diagram of another example user plane architecture of a 5G LAN service according to this application. Different from FIG. 3A, FIG. 3B shows the user plane architecture of a 5G LAN service including a plurality of different 5G LANs. For example, a UPF 1, a UPF 2, and a UPF 3 belong to a 5G LAN marked as 5G LAN 1, and the UPF 1, a UPF 4, and a UPF 5 belong to another 5G LAN marked as 5G LAN 2. A plurality of UEs are connected to different user planes in the 5G LAN. A UE 1 and a UE 6 are connected to the UPF 1, a UE 2 is connected to the UPF 2, a UE 3 is connected to the UPF 3, a UE 4 is connected to the UPF 4, and a UE 5 is connected to the UPF 5. The UE 1, the UE 2, the UE 3, and the UE 6 access the user planes in the 5G LAN 1, which are marked as 5GC UP 1. The UE 1, the UE 2, the UE 3, and the UE 6 form a 5G VN group marked as a group 1. The UE 1, the UE 4, and the UE 5 access the user planes corresponding to the 5G LAN 2, which are marked as 5GC UP 2. The UE 1, the UE 4, and the UE 5 belong to another 5G VN group marked as a group 2. One same UE may be located in different 5G LANs. For example, the UE 1 is located in both the group 1 and the group 2.

Quantities of UPFs and UEs in FIG. 3A and FIG. 3B are merely examples. In actual application, the user plane architecture of the 5G LAN service provided in this application may provide services for more terminals, and may include more UPFs. In addition, in the user plane architecture of the 5G LAN service shown in FIG. 3A and FIG. 3B, although the UPF, the UE, and a DN are shown, the user plane architecture of the 5G LAN service may include but not limited to the foregoing content. For example, the architecture may further include an SMF network element, a PCF network element, a device configured to bear a virtualized network function, a wireless relay device, and the like. These are understood to a person of ordinary skill in the art, and are not described in detail herein.

The 5G LAN in this application may be alternatively replaced with a 5G LAN-type service, a 5G LAN-VN, a 5G VN, or the like.

To help a person skilled in the art understand the solutions in the embodiments of this application, the following describes technical terms in this application.

(1) An N4 session includes a UE-level N4 session and a group-level N4 session.

The N4 session is created by an SMF network element on a UPF network element.

For example, when creating a PDU session of a UE, the SMF network element may indicate the UPF network element to create an N4 session corresponding to the PDU session, which may also be referred to as a UE-level N4 session (in this specification, the UE-level N4 session and the N4 session corresponding to the PDU session may be used interchangeably). For example, in FIG. 3B, the UE 1 and the UE 6 are connected to the UPF 1 through a RAN 1. In this case, when creating a PDU session of the UE 1, the SMF may indicate the UPF 1 to create an N4 session corresponding to the PDU session of the UE 1; and when creating a PDU session of the UE 6, the SMF indicates the UPF 1 to create an N4 session corresponding to the PDU session of the UE 6. A routing rule in a UE-level N4 session can be used to detect and forward data related to the UE. When receiving a request for deleting a PDU session of the UE, the SMF triggers the UPF network element to delete an N4 session corresponding to the PDU session.

For ease of description, the N4 session corresponding to the PDU session is distinguished below using an "identifier of the UE". For example, the N4 session corresponding to the PDU session of the UE 1 may be referred to as an N4 session of the UE 1, the N4 session corresponding to the PDU session of the UE 6 may be referred to as an N4 session of the UE 6, and so on.

To support communication between different UPF network elements and communication between the UPF network element and the DN in a 5G LAN service, the SMF network element further needs to create, on each UPF network element that provides a 5G LAN service, a group-level N4 session for a corresponding 5G VN group (or 5G LAN group). A routing rule in the group-level N4 session is used to detect data (which may be understood as data belonging to the 5G VN group) of any UE in the 5G VN group, and to forward the data belonging to the 5G VN group. Forwarding the data belonging to the 5G VN group may include across-UPF network element (on different UPF network elements in the 5G LAN group) forwarding, forwarding through an N6 tunnel, or local forwarding. For example, in FIG. 3A, the UE 1 to the UE 3 belong to one 5G LAN, and the SMF network element creates a group-level N4 session for the 5G LAN on each UPF network element. FIG. 3B includes two 5G LANs, that is, the 5G LAN 1 and the 5G LAN 2. The SMF network element creates a group-level N4 session corresponding to the 5G LAN 1 on a UPF network element corresponding to the 5G LAN 1, and the session is marked as an N4 session of the group 1. The SMF network element creates a group-level N4 session corresponding to the 5G LAN 2 on a UPF network element corresponding to the 5G LAN 2, and the session is marked as an N4 session of the group 2. When creating a first PDU session to the 5G LAN, the SMF network element creates the group-level N4 session corresponding to the 5G LAN; and when releasing a last PDU session to the 5G LAN, the SMF network element deletes the group-level N4 session corresponding to the 5G LAN.

One UPF network element may include one or more N4 sessions corresponding to PDU sessions. For example, if a plurality of UEs are connected to a same UPF network element, the UPF network element needs to create an N4 session corresponding to a PDU session of each UE. In addition, one UPF network element may include one or more group-level N4 sessions. For example, in FIG. 3B, the UE 1, the UE 2, the UE 3, and the UE 6 form a 5G VN group, and the UE 1, the UE 4, and the UE 5 form another 5G VN group. In this case, two group-level N4 sessions need to be created on the UPF 1, that is, an N4 session of the group 1 and an N4 session of the group 2. A quantity of N4 sessions is not limited in this application.

(2) A routing rule is included in a context of an N4 session, is used to detect and forward a data packet, and includes an uplink (UL) packet detection rule (PDR), an uplink forwarding action rule (UL FAR) associated with the UL PDR, a downlink (DL) packet detection rule (PDR), and a DL FAR associated with the DL PDR. The PDR (the UL PDR and the DL PDR) is used to detect data that is transmitted to the UPF network element through a PDU session tunnel or data that is forwarded through an internal interface of the UPF network element, and the FAR (the UL FAR and the DL FAR) is used to indicate the UPF network element to forward, copy, buffer, discard, or notify detected data. When indicating the UPF to create an N4 session, the SMF network element sets a corresponding routing rule for the N4 session. The data transmitted from the PDU session tunnel may be understood as data received by the UPF network element using a PDU session.

For an N4 session corresponding to the PDU session:

The UL PDR includes a source interface parameter, a tunnel information parameter, and an Ethernet filter parameter, or includes Ethernet PDU session information (a media access control (MAC) address of the UE) or an IP address of the UE.

The UL FAR associated with the UL PDR includes a target interface parameter for transmitting a data packet matching the UL PDR to a target interface. The SMF sets a value of the target interface parameter to a value (for example, "5G LAN internal") corresponding to the internal interface of the UPF. It may be understood that the UL FAR, in the N4 session, corresponding to the PDU session is used to locally forward the data packet matching the UL PDR in the N4 session to the internal interface of the UPF.

The DL PDR includes the source interface parameter, the Ethernet filter parameter (a MAC or IP address, an Ethernet type, and an Ethernet label), the Ethernet PDU session information (the MAC address of the UE), or the IP address of the UE.

The DL FAR associated with the DL PDR includes the target interface parameter and/or a parameter of an external tunnel for transmitting a data packet matching the DL PDR to a target interface. The SMF network element sets a value of the target interface parameter to "access side" or "core side", and sets a value of the parameter of the external tunnel to tunnel information (for example, a tunnel header General Packet Radio Service (GPRS) tunneling protocol (GTP)-U tunnel endpoint identifier (TEID) of the PDU session on an AN or the UPF network element) of the PDU session. It may be understood that the DL FAR, in the N4 session, corresponding to the PDU session is used to transmit a data packet matching the DL PDR in the N4 session to a specified PDU session tunnel.

For a group-level N4 session, refer to the following.

The UL PDR includes the source interface parameter, the Ethernet filter parameter, the Ethernet PDU session information parameter (the MAC address of the UE), or the IP address of the UE.

The UL FAR associated with the UL PDR includes the target interface parameter and/or the parameter of the external tunnel for transmitting the data packet matching the UL PDR to the target interface. The SMF sets the value of the target interface parameter to "5G LAN N19" or "core side", and sets the value of the parameter of the external tunnel to information (for example, a tunnel header GTP-U TEID of a peer UPF connected to the UPF) about an N19 tunnel. It may be understood that the UL FAR in the group-level N4 session is used to forward the data packet matching the UL PDR in the group-level N4 session to the N19 tunnel connecting to the UPF and another UPF.

The DL PDR includes the source interface parameter and/or the tunnel information parameter.

The DL FAR associated with the DL PDR includes the target interface parameter for transmitting the data packet matching the DL PDR to the target interface. The SMF sets the value of the target interface parameter to the value (for example, "5G LAN internal") corresponding to the internal interface of the UPF. It may be understood that the DL FAR in the group-level N4 session is used to locally forward the data packet matching the DL PDR in the group-level N4 session to the internal interface of the UPF.

(3) The internal interface of the UPF is a virtual port or another port on the UPF network element, and is used by the UPF network element to locally forward a received data packet. Local forwarding to the internal interface of the UPF network element means that the UPF network element re-receives the data packet on the internal interface, such that the data packet is detected by the UPF network element again. Therefore, a corresponding routing rule is matched through classification, and the data packet is forwarded to a correct path. Before re-detection, the UPF network element may decapsulate an outer tunnel header for the data packet. Optionally, information about a new outer tunnel header may be further re-encapsulated into the data packet. New tunnel information may be included in a FAR of the routing rule, or generated by the UPF network element based on forwarding indication information in the FAR.

(4) The N19 tunnel is a user plane tunnel shared by members in a 5G LAN group, and is connected to two PDU session anchor (PSA) UPF network elements in the 5G LAN group.

(5) The N6 tunnel is a tunnel between the PSA UPF network element and the DN.

(6) In the description of this application, "a plurality of" means two or more. In view of this, in the embodiments of this application, "a plurality of" may also be understood as "at least two". The term "at least one" may be understood as one or more, for example, understood as one, two, or more. For example, including at least one means including one, two, or more, and does not limit which are included. For example, including at least one of A, B, and C means that A, B, C, A and B, A and C, B and C, or all of A, B, and C may be included. The term "and/or" describes an association relationship for describing associated objects and indicates that three relationships may exist. For example, A and/or B may indicate the following three cases: Only A exists, both A and B exist, and only B exists. In addition, unless otherwise specified, the character "/" generally indicates an "or" relationship between associated objects. The terms "system" and "network" may be used interchangeably in the embodiments of this application.

Unless otherwise stated on the contrary, ordinal numerals such as "first" and "second" in the embodiments of this application are used to distinguish between a plurality of objects, and are not intended to limit a sequence, a time sequence, a priority, or an importance degree of the plurality of objects.

In addition, the user plane architecture of the 5G LAN service may be further applicable to a future communications technology. The user plane architecture of the 5G LAN service described in the embodiments of this application is intended to more clearly describe the technical solutions in the embodiments of this application. This does not constitute a limitation on the technical solutions provided in the embodiments of this application. A person of ordinary skill in the art may learn that, as a network architecture evolves, the technical solutions provided in the embodiments of this application are also applicable to a similar technical problem.

The following describes technical features in the embodiments of this application.

In the 5G LAN service, there may be the following three communication modes for a 5G LAN group.

Figure 4A:
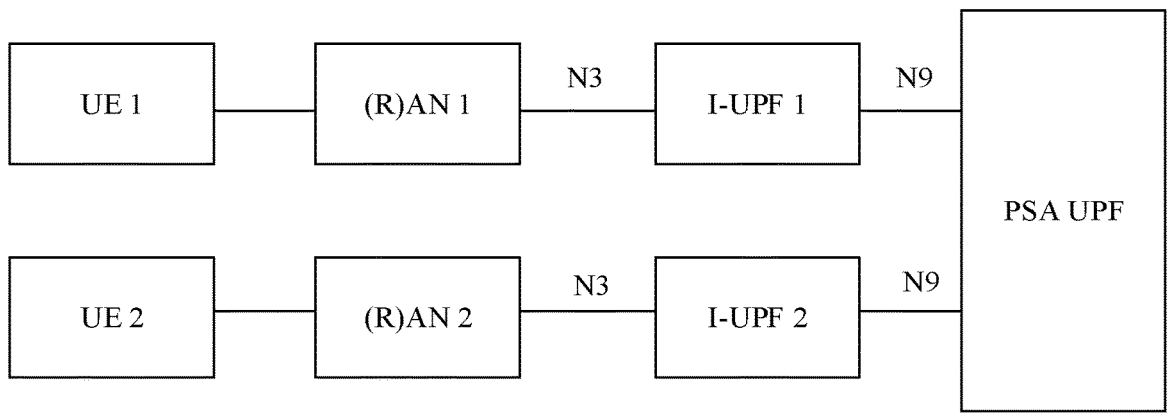
FIG. 4A is a diagram of a user plane architecture in a local forwarding manner of a 5G LAN group.

For a first communication mode, refer to FIG. 4A. FIG. 4A is a diagram of a user plane architecture in a local forwarding manner of a 5G LAN group. As shown in FIG. 4A, a UE 1 is connected to a PSA UPF network element through a (R)AN 1 and an intermediate UPF 1 (intermediate-UPF 1, I-UPF 1), and a UE 2 is connected to the PSA UPF network element through a (R)AN 2 and an I-UPF 2. In other words, a PDU session of the UE 1 and a PDU session of the UE 2 use a same anchor UPF network element. In this case, the anchor UPF network element may locally forward a data flow between the PDU session of the UE 1 and the PDU session of the UE 2 through an internal interface of the anchor UPF network element.

In this case, the local forwarding manner may also be understood as a manner in which a data packet sent to any UE in the 5G LAN group is sent to another PDU session of the anchor UPF network element through the internal interface.

Figure 4B:
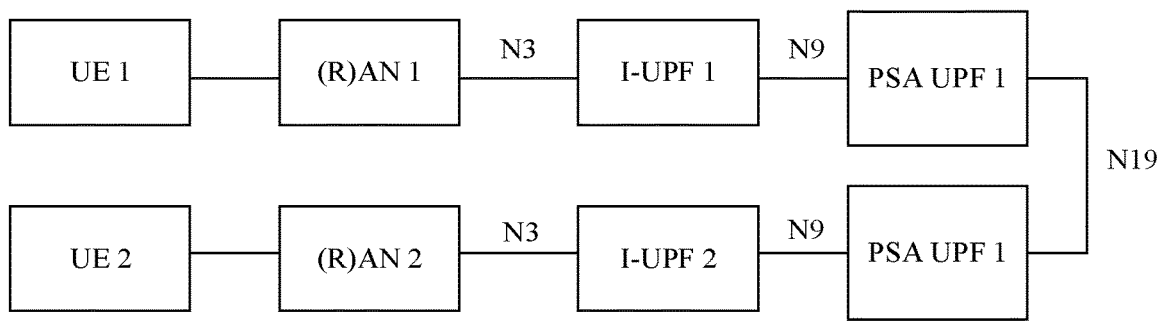
FIG. 4B is a diagram of a user plane architecture in an across-UPF forwarding manner of a 5G LAN group.

For a second communication mode, refer to FIG. 4B. FIG. 4B is diagram of a user plane architecture in an across-UPF forwarding manner of a 5G LAN group. As shown in FIG. 4B, a UE 1 is connected to a PSA UPF network element 1 through a (R)AN 1 and an I-UPF 1, and a UE 2 is connected to a PSA UPF network element 2 through a (R)AN 2 and an I-UPF 2. The PSA UPF network element 1 communicates with the PSA UPF network element 2 through an N19 tunnel. In other words, a PDU session of the UE 1 and a PDU session of the UE 2 use different anchor UPF network elements. In this case, a data flow between the PDU session of the UE 1 and the PDU session of the UE 2 may be forwarded through the N19 tunnel.

In this case, the across-UPF forwarding manner may also be understood as a manner in which a data packet sent to any UE in the 5G LAN group is sent to another PDU session of different anchor UPF network elements through the N19 tunnel.

Figure 4C:
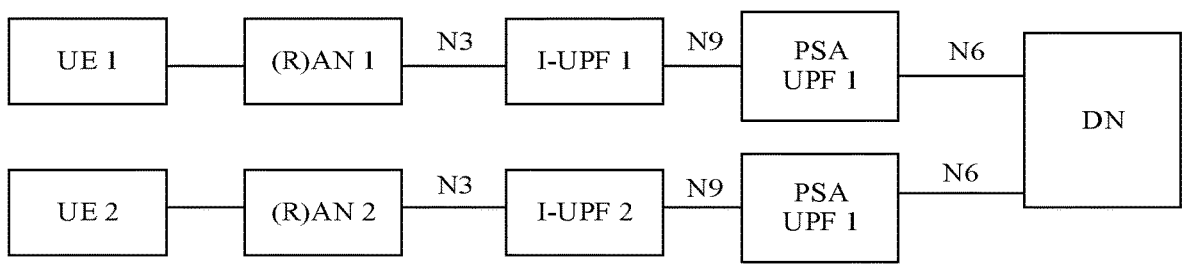
FIG. 4C is a diagram of a user plane architecture in an N6-based forwarding manner of a 5G LAN group.

For a third communication mode, refer to FIG. 4C. FIG. 4C is a diagram of a user plane architecture in an N6-based forwarding manner of a 5G LAN group. As shown in FIG. 4C, a UE 1 is connected to a PSA UPF network element 1 through a (R)AN 1 and an I-UPF 1, a UE 2 is connected to a PSA UPF network element 2 through a (R)AN 2 and an I-UPF 2, and the PSA UPF network element 1 and the PSA UPF network element 2 are connected to a same DN. In this case, a data flow between a PDU session of the UE 1 and a PDU session of the UE 2 may be forwarded to the DN through an N6 tunnel, and then the DN forwards the data flow.

In this case, the N6-based forwarding manner may also be understood as a manner in which a data packet sent to any UE in the 5G LAN group is sent to another PDU session of different anchor UPF network elements or a same anchor UPF network element through an N6 interface.

A communication mode of the 5G LAN group is configured by an SMF network element. For example, if the SMF network element determines that anchors of two PDU sessions corresponding to the communication parties are a same PSA UPF network element, the SMF may determine that a data flow is transmitted between the two PDU sessions in a local forwarding manner. For another example, if the SMF network element determines that anchors of the two PDU sessions corresponding to the communication parties are different PSA UPF network elements, the SMF network element may determine that a data flow is transmitted between the two PDU sessions in an across-UPF forwarding manner, and so on. For still another example, some service servers need to perform data backup or secondary processing (for example, third-party interception charging or data collection) on all data on the cloud. In this case, the SMF network element may determine to use the N6-based forwarding manner to transmit a data flow of the service.

However, how to use the foregoing three forwarding manners in a 5G LAN group is an urgent problem to be resolved.

In view of this, based on the network architectures shown in FIG. 1 and FIG. 2, embodiments of this application provide a routing rule configuration method and a communications apparatus, to implement data forwarding in a 5G LAN group using the foregoing three forwarding manners, and improve data forwarding flexibility of a UPF network element. The following describes the routing rule configuration method provided in this application in two embodiments (namely, Embodiment 1 and Embodiment 2).

A main difference between Embodiment 1 and Embodiment 2 lies in that first information used by the SMF network element to generate a routing rule is different. In Embodiment 1, the first information is a data routing policy corresponding to the 5G LAN group, while in Embodiment 2, the first information is a PCC rule obtained by the SMF network element from a PCF network element.

It should be noted that in this embodiment of this application, a session management function network element is the SMF network element, a policy control function network element is the PCF network element, and a first UPF network element is the UPF network element. The first UPF network element may be one UPF network element in the plurality of UPF network elements shown in FIG. 3A or FIG. 3B. In addition, the UPF network element, the SMF network element, and the PCF network element may be used as independent physical function entities or logical function entities in actual application. This is not limited herein.

Embodiment 1

Figure 5:
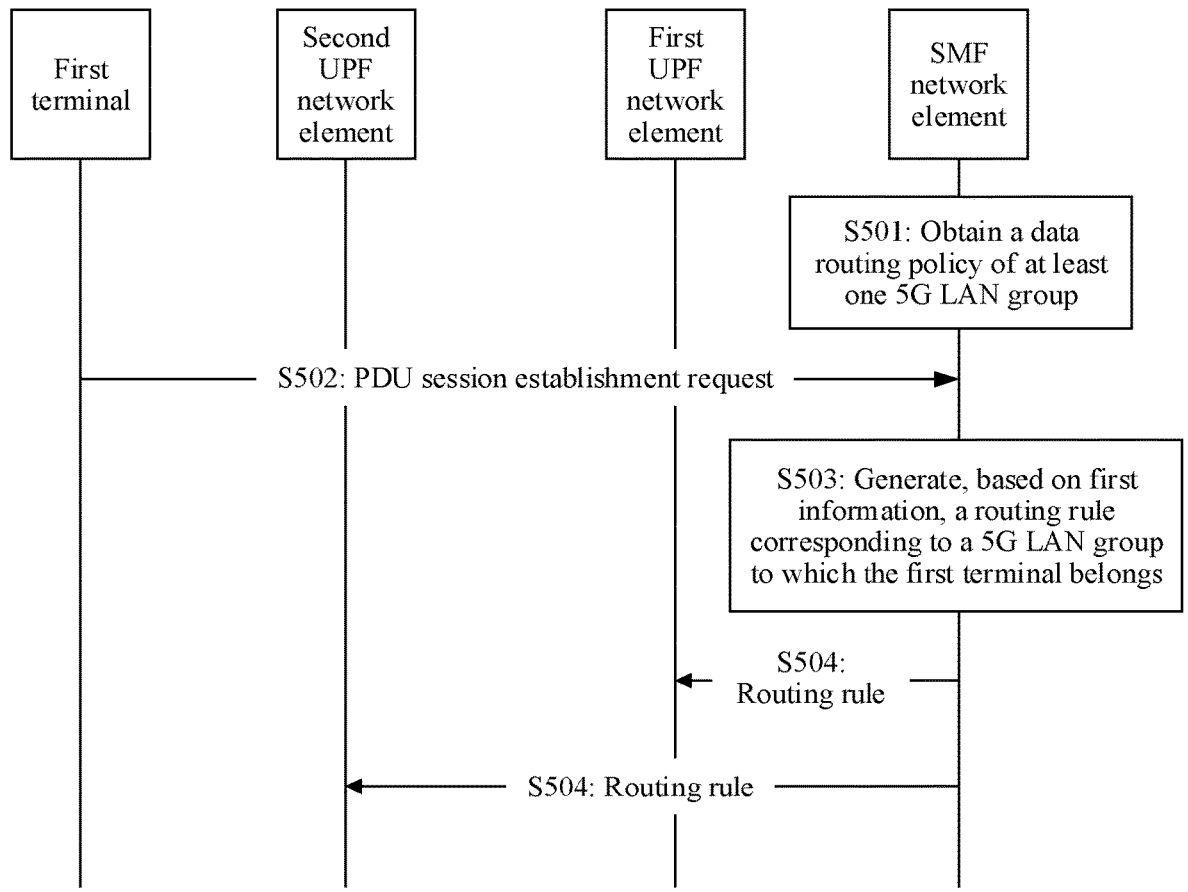
FIG. 5 is a flowchart of an example of a routing rule configuration method according to an embodiment of this application.

FIG. 5 is a flowchart of a routing rule configuration method according to an embodiment of this application. The flowchart is described as follows.

S501: An SMF network element obtains a data routing policy corresponding to at least one 5G LAN group.

In this embodiment of this application, the at least one 5G LAN group is a 5G LAN group managed by the SMF network element. For example, during creation of the 5G LAN group, a PCF network element may indicate to select, for each 5G LAN group through an NRF network element, a local configuration, or an NEF network element, an SMF network element used to manage communication of the 5G LAN group. For example, the PCF network element may select a different SMF network element for each 5G LAN group. In other words, one SMF network element manages communication of one 5G LAN group. Alternatively, the PCF network element may select a same SMF network element for different 5G LAN groups, that is, one SMF network element manages communication of a plurality of 5G LAN groups. After the PCF network element selects a corresponding SMF network element for each 5G LAN group, the SMF network element obtains a data routing policy corresponding to each managed 5G LAN group. In this embodiment of this application, the data routing policy corresponding to each 5G LAN group is used to indicate whether the 5G LAN group forwards a data packet through an N6 tunnel. The following describes the data routing policy corresponding to each 5G LAN group.

In this embodiment of this application, the data routing policy corresponding to each 5G LAN group may include but is not limited to the following information.

A first type of information is an identifier of the 5G LAN group.

Because one SMF network element may manage communication of a plurality of 5G LAN groups, the SMF network element may determine a 5G LAN group to which the data routing policy belongs based on the identifier of the 5G LAN group in the data routing policy.

A second type of information is information used to indicate a supported level of an N6-based forwarding manner. The supported level includes a mandatory supported level, a conditional supported level, or an unsupported level. The mandatory supported level indicates preferentially using the N6-based forwarding manner. The conditional supported level indicates preferentially using a non-N6-based forwarding manner. The non-N6-based forwarding manner includes a manner of forwarding a data packet based on an N19 interface and a manner of forwarding a data packet based on an internal interface of a UPF network element.

If the supported level is the mandatory supported level, a first priority of the N6-based forwarding manner is higher than a second priority of the non-N6-based forwarding manner (for example, an across-UPF network element forwarding manner or a local forwarding manner).

If the supported level is the conditional supported level, the first priority of the N6-based forwarding manner is lower than the second priority of the non-N6-based forwarding manner (for example, the across-UPF network element forwarding manner or the local forwarding manner).

If the supported level is the unsupported level, the N6-based forwarding manner is not used.

A third type of information is an identifier of a first data flow that supports the N6-based forwarding manner or an identifier of at least one second terminal that supports the N6-based forwarding manner. The first data flow may include all data flows in the 5G LAN group, or may include some data flows in the 5G LAN group, and the at least one second terminal may include all terminals in the 5G LAN group, or may include some terminals in the 5G LAN group. This is not limited herein.

It should be noted that the identifier of the data flow is a service data flow (SDF) template and includes one or more packet filters, and may be used to match a specific service data flow. The identifier of the terminal may be a generic public subscription identifier (GPSI), a subscription permanent identifier (SUPI), or an address of the terminal (for example, an IP address or a MAC address).

A fourth type of information is path information for forwarding a data packet in the N6-based forwarding manner. For example, the path information may be a route configuration identifier, or a data network access identifier (DNAI) and N6 routing information corresponding to the DNAI.

It should be noted that the data routing policy corresponding to each 5G LAN group may be a combination of the foregoing four pieces of information. For example, the data routing policy may include only the first type of information and the second type of information, or may include the first type of information, the second type of information, and the fourth type of information. In addition, data routing policies of different 5G LAN groups may include different information. For example, if a data routing policy corresponding to a 5G LAN 1 includes the first type of information and the second type of information, and the second type of information indicates that the 5G LAN group mandatorily supports the N6-based forwarding manner, the data routing policy corresponding to the 5G LAN 1 may further include the third type of information and the fourth type of information. A data routing policy corresponding to a 5G LAN 2 includes the first type of information and the second type of information, and the second type of information indicates that the 5G LAN group does not support the N6-based forwarding manner. In this case, the data routing policy corresponding to the 5G LAN 2 may not include the third type of information or the fourth type of information. A type of information included in the data routing policy corresponding to each 5G LAN group is not limited in this embodiment of this application.

In this embodiment of this application, the SMF network element may obtain the data routing policy corresponding to the at least one 5G LAN group in any one of a plurality of manners described below.

In a first obtaining manner, the data routing policy corresponding to the at least one 5G LAN group is preconfigured on the SMF network element.

For example, when creating a 5G LAN group, an AF network element generates a data routing policy corresponding to each 5G LAN group. For example, if the AF network element determines that a service server of the 5G LAN group needs to perform data backup or secondary processing on all data on the cloud, the AF network element may generate a data routing policy that includes the foregoing four types of information for the 5G LAN group. The second type of information in the data routing policy is used to indicate that the N6-based forwarding manner is mandatorily supported. For another example, if the AF network element determines that the 5G LAN group does not have a corresponding service server, data of the 5G LAN group does not need to be uploaded to a DN. Therefore, the AF network element may generate a data routing policy that includes the first type of information and the second type of information for the 5G LAN group. The second type of information in the data routing policy is used to indicate that the N6-based forwarding manner is not supported.

Then, the AF network element configures the generated at least one data routing policy on the PCF network element through a network exposure function (NEF) network element. After the PCF network element determines an SMF network element for management for each 5G LAN group, the PCF network element delivers the data routing policy corresponding to the at least one 5G LAN group managed by the SMF network element to the SMF network element.

In a second obtaining manner, the AF network element configures the generated at least one data routing policy on the PCF network element in the same manner as that in the first obtaining manner. Then, after the PCF network element determines an SMF network element for management for each 5G LAN group, the SMF network element may send data routing policy request information to the PCF network element when creating a PDU session of a first 5G LAN group. The PCF network element sends the data routing policy corresponding to the at least one 5G LAN group managed by the SMF network element to the SMF network element based on the data routing policy request information.

In a third obtaining manner, the AF network element generates at least one data routing policy in the same manner as that in the first obtaining manner, and then configures the generated at least one data routing policy on a UDR network element through a UDM network element and the NEF network element. The PCF network element obtains the at least one data routing policy from the UDR network element, and then may actively deliver the at least one data routing policy to the SMF network element, or may send the data routing policy corresponding to the 5G LAN group managed by the SMF network element to the SMF network element based on the data routing policy request information sent by the SMF network element.

In a fourth obtaining manner, the AF network element generates at least one data routing policy in the same manner as that in the first obtaining manner, and then configures the generated at least one data routing policy on the UDR network element through the UDM network element and the NEF network element. The SMF network element may send the data routing policy request information to the UDR network element through the UDM network element, to obtain the data routing policy from the UDR network element. Alternatively, after receiving a subscription data request information sent by the SMF, the UDR network element may include the data routing policy in subscription data and send the subscription data to the SMF network element through the UDM network element.

In a fifth obtaining manner, the AF network element generates at least one data routing policy in the same manner as that in the first obtaining manner, and then configures the generated at least one data routing policy on the NEF network element. The NEF network element selects, for each 5G LAN group through the NRF or a local configuration, an SMF network element used to manage communication of the 5G LAN group, and sends a data routing policy corresponding to the at least one 5G LAN group managed by the SMF network element to the SMF network element.

In a sixth obtaining manner, the AF network element generates at least one data routing policy in the same manner as that in the first obtaining manner, and then configures the generated at least one data routing policy on the UDR network element through the UDM network element and the NEF network element. When the SMF network element determines that a prestored data routing policy is unavailable (for example, the prestored data routing policy has expired), the SMF network element sends a data routing policy obtaining request to the NEF network element, and then the NEF network element obtains a data routing policy from the UDR network element, and forwards the data routing policy to the SMF network element.

The foregoing six obtaining manners are merely examples. Persons skilled in the art may select, based on a use requirement, a manner in which the SMF network element obtains the data routing policy. This is not limited herein.

S502: The first terminal sends a PDU session establishment request used to create a PDU session to a 5G LAN group to which the first terminal belongs, and the SMF network element receives the PDU session establishment request.

S503: The SMF network element generates, based on the first information, a routing rule corresponding to the 5G LAN group to which the first terminal belongs.

In this embodiment of this application, the first information is a data routing policy corresponding to the 5G LAN group to which the first terminal belongs. For example, after receiving the PDU session establishment request sent by the first terminal, the SMF network element may determine, based on a DNN in the PDU session establishment request, the 5G LAN group to which the first terminal belongs. Then, the SMF network element obtains the data routing policy corresponding to the 5G LAN group to which the first terminal belongs from the at least one data routing policy described in step S501. For ease of description, the data routing policy corresponding to the 5G LAN group to which the first terminal belongs is referred to as a first data routing policy in the following.

After obtaining the first data routing policy, the SMF network element generates a corresponding routing rule based on the first data routing policy, where the routing rule is used to indicate to send a data packet of the first terminal to the N6 interface or discard the data packet. For example, if the first data routing policy includes information used to indicate to forward a data packet through the N6 tunnel, the data packet is a data packet of the 5G LAN group. For example, the data packet may be a data packet sent to any UE in the 5G LAN group. Alternatively, the data packet may be a data packet sent to a server, or the data packet may be a data packet that does not match another PDR, or the like.

It should be noted that the routing rule corresponding to the 5G LAN group to which the first terminal belongs and that is generated by the SMF network element may be understood as a routing rule of a group-level N4 session corresponding to the 5G LAN group or a routing rule of an N4 session corresponding to a PDU session. The group-level N4 session includes two types of PDRs to support N6-based forwarding and across-UPF forwarding, where one type is a PDR for a specific data flow, while the other type is a PDR (or may be understood as a default PDR) for an unmatched data flow. The PDR for an unmatched data flow may be understood as that when a data packet does not match the PDR for a specific data flow, the data packet matches the PDR for an unmatched data flow. The N4 session corresponding to the PDU session includes the PDR for a specific data flow to support local forwarding.

In this embodiment of this application, step S503 may include but is not limited to a plurality of cases in the following.

In a first case, if the data routing policy corresponding to the 5G LAN group to which the first terminal belongs includes information used to indicate that the 5G LAN group mandatorily supports the N6-based forwarding manner, the SMF network element determines that all flows of the 5G LAN group preferentially use the N6-based forwarding manner and then use the local forwarding manner or the across-UPF forwarding manner.

For example, the SMF network element determines that a filter parameter of the PDR for a specific data flow in the group-level N4 session of the 5G LAN group includes an address of the first terminal, to obtain a PDR 1 (namely, a first PDR). Then, the SMF network element sets a target interface of a FAR associated with the PDR 1 to a value corresponding to the N6 interface, to obtain a FAR 1 (namely, a first FAR); and sets a default PDR to support the N6-based forwarding manner, for example, sets a target interface of a FAR associated with the default PDR to a value corresponding to the N6 interface.

In a second case, if the data routing policy corresponding to the 5G LAN group to which the first terminal belongs includes information used to indicate that the 5G LAN group conditionally supports the N6-based forwarding manner, the SMF network element determines that all flows of the 5G LAN group preferentially use the local forwarding manner or the across-UPF network element forwarding manner and then use the N6-based forwarding manner.

In an example, the SMF network element sets a target interface of a FAR that is in the group-level N4 session of the 5G LAN group and that is associated with a default PDR for a quality of service flow to a value corresponding to the N6 interface, to obtain a FAR 2 (namely, a second FAR), where the default PDR for the quality of service flow is a PDR 2 (namely, a second PDR). In addition, the SMF network element configures the PDR for a specific data flow in the group-level N4 session of the 5G LAN group to support the across-UPF forwarding manner, or in the N4 session corresponding to the PDU session to support the local forwarding manner.

In a third case, if the data routing policy corresponding to the 5G LAN group to which the first terminal belongs includes information used to indicate that the 5G LAN group does not support the N6-based forwarding manner, the SMF network element determines that all flows of the 5G LAN group use the local forwarding manner or the across-UPF network element forwarding manner, and does not use the N6-based forwarding manner.

In an example, the SMF network element sets a discard indication in a FAR that is in the group-level N4 session of the 5G LAN group and that is associated with a default PDR for a quality of service flow. In this case, the default PDR for the quality of service flow is a PDR 3 (namely, a third PDR), and a FAR that includes the discard indication is a FAR 3 (namely, a third FAR). In addition, the SMF network element configures the PDR for a specific data flow in the group-level N4 session of the 5G LAN group to support the across-UPF forwarding manner, or in the N4 session corresponding to the PDU session to support the local forwarding manner.

In a fourth case, it is assumed that the data routing policy corresponding to the 5G LAN group to which the first terminal belongs includes information used to indicate that the 5G LAN group mandatorily supports the N6-based forwarding manner, and the data routing policy corresponding to the 5G LAN group to which the first terminal belongs includes the identifier of the first data flow that supports the N6-based forwarding manner or the identifier of the at least one second terminal. In this case, the SMF network element determines that the first data flow of the 5G LAN group or the at least one second terminal preferentially uses the N6-based forwarding manner, and then uses the local forwarding manner or the across-UPF network element forwarding manner.

In an example, the SMF network element determines whether a data flow of the first terminal belongs to the first data flow or whether the identifier of the at least one second terminal includes an identifier of the first terminal. If the data flow of the first terminal belongs to the first data flow or the identifier of the at least one second terminal includes the identifier of the first terminal, the SMF network element determines that the N6-based forwarding manner is used for the first terminal; otherwise, the SMF network element determines that the non-N6-based forwarding manner is used for the first terminal. If the SMF determines to use the N6-based forwarding manner, the SMF network element determines that the filter parameter of the PDR for a specific data flow in the group-level N4 session of the 5G LAN group includes the address of the first terminal, to obtain a PDR 4. Then, the SMF network element sets a target interface of a FAR associated with the PDR 4 to a value corresponding to the N6 interface, to obtain a FAR 4; and sets a default PDR to support the N6-based forwarding manner, for example, sets a target interface of a FAR associated with the default PDR to a value corresponding to the N6 interface.

It should be noted that the data flow of the first terminal belongs to the first data flow, which may be understood as that the identifier of the first data flow can match a data flow of the second terminal.

In a fifth case, it is assumed that the data routing policy corresponding to the 5G LAN group to which the first terminal belongs includes information used to indicate that the 5G LAN group mandatorily supports the N6-based forwarding manner, and includes the path information for forwarding a data packet in the N6-based forwarding manner. In this case, the SMF network element determines that all flows of the 5G LAN group preferentially use the N6-based forwarding manner and then uses the local forwarding manner or the across-UPF network element forwarding manner, where when the N6-based forwarding manner is used, a path indicated by the data routing policy corresponding to the 5G LAN group is used.

For example, the SMF network element determines that the filter parameter of the PDR for a specific data flow in the group-level N4 session of the 5G LAN group includes the address of the first terminal, to obtain a PDR 5. Then, the SMF network element sets a target interface of a FAR associated with the PDR 5 is set to a value corresponding to the N6 interface, and sets the path indicated by the data routing policy corresponding to the 5G LAN group in the FAR, to obtain a FAR 5. Further, the SMF network element sets a default PDR to support the N6-based forwarding manner.

In a sixth case, it is assumed that the data routing policy corresponding to the 5G LAN group to which the first terminal belongs includes information used to indicate that the 5G LAN group conditionally supports the N6-based forwarding manner, and the path information for forwarding a data packet in the N6-based forwarding manner. In this case, the SMF network element determines that all flows of the 5G LAN group preferentially use the local forwarding manner or the across-UPF network element forwarding manner, and then use the N6-based forwarding manner, where when the N6-based forwarding manner is used, the path indicated by the data routing policy corresponding to the 5G LAN group is used.

In an example, the SMF network element sets the target interface of the FAR that is in the group-level N4 session of the 5G LAN group and that is associated with the default PDR for the quality of service flow to a value corresponding to the N6 interface, and sets the path indicated by the data routing policy corresponding to the 5G LAN group in the FAR, to obtain a FAR 6, where the default PDR for the quality of service flow is a PDR 6. In addition, the SMF network element configures the PDR for a specific data flow in the group-level N4 session of the 5G LAN group to support the across-UPF forwarding manner, or in the N4 session corresponding to the PDU session to support the local forwarding manner.

A seventh case is a combination of the fourth case and the fifth case, and details are not described herein again.

The foregoing seven cases mainly describe the PDR and the FAR of the N6-based forwarding manner. Because the 5G LAN group may further support the local forwarding manner or an N19-based forwarding manner, the SMF network element further needs to separately generate a routing rule corresponding to the local forwarding manner or a routing rule corresponding to the N19-based forwarding manner. A generation manner is similar to a manner of generating the PDR and the FAR of the N6-based forwarding manner. Details are not described herein again.

S504: The SMF network element sends the routing rule to the first UPF network element, and the first UPF network element receives the routing rule and configures the routing rule on the first UPF network element.

In this embodiment of this application, the first UPF network element represents each UPF network element in the 5G LAN group. After generating the routing rule corresponding to the 5G LAN group, the SMF network element configures the routing rule in a group-level N4 session of each UPF network element in the 5G LAN group or an N4 session corresponding to a PDU session of the first terminal.

In an example, the SMF network element may send configuration information to the first UPF network element, where the configuration information includes an identifier of the N4 session and a routing rule corresponding to the N4 session. After receiving the configuration information, the first UPF network element stores the configuration information in the corresponding N4 session.

In the foregoing technical solution, the SMF network element may generate, for a 5G LAN group according to the data routing policy corresponding to the 5G LAN group, routing rules corresponding to the three forwarding manners, such that a data packet in the 5G LAN group may be forwarded in the foregoing three forwarding manners. This can meet various forwarding requirements of service data and improve data forwarding flexibility.

Figure 6:
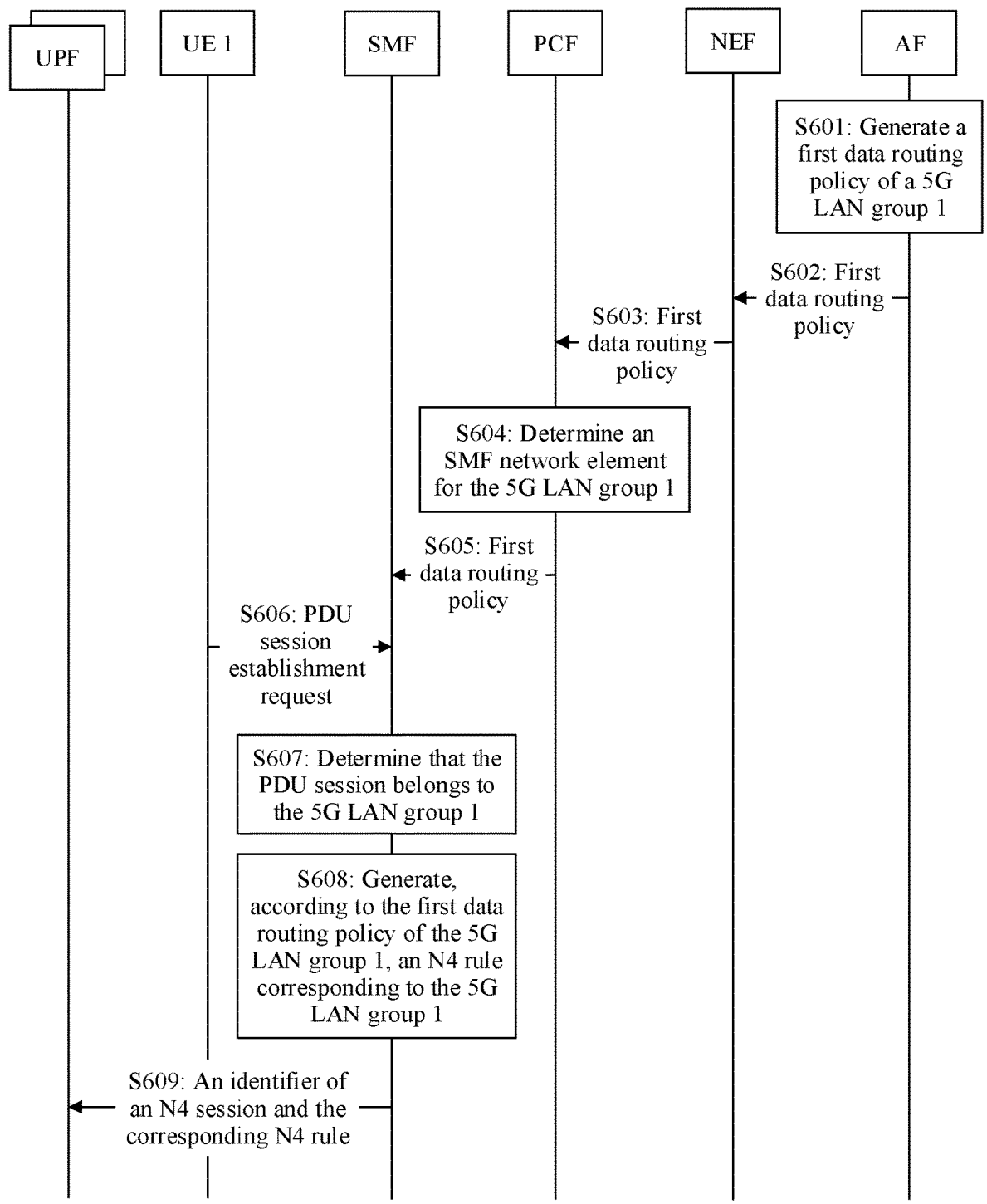
FIG. 6 is a flowchart of an example of a routing rule configuration manner according to an embodiment of this application.

Based on a same concept, an embodiment of this application further provides a management method in LAN communication. The method may be considered as an example of the method shown in FIG. 5. FIG. 6 is a method flowchart of this example. The method flowchart is described as follows.

S601: An AF network element generates a first data routing policy corresponding to a 5G LAN group 1.

The first data routing policy includes an identifier of the 5G LAN group 1, an N6-based forwarding manner mandatorily supported by the 5G LAN group 1, and an identifier of a first data flow that supports the N6-based forwarding manner.

S602: The AF network element sends the first data routing policy to an NEF network element, and the NEF network element receives and stores the first data routing policy.

S603: The NEF network element sends the first data routing policy to a PCF network element, and the PCF network element receives the first data routing policy.

S604: The PCF network element determines, for the 5G LAN group 1, an SMF network element used to manage the 5G LAN group 1.

S605: The PCF sends the first data routing policy to the SMF network element used to manage the 5G LAN group 1, and the SMF network element receives the first data routing policy group.

S606: A UE 1 sends a PDU session establishment request to the SMF network element, and the SMF network element receives the PDU session establishment request.

S607: The SMF network element determines that the PDU session belongs to the 5G LAN group 1.

For example, the SMF network element obtains a DNN in the PDU session establishment request and determines that the DNN is associated with the 5G LAN group 1, such that the SMF network element determines that the PDU session belongs to the 5G LAN group 1, and selects a UPF network element 1 to serve the PDU session.

S608: The SMF network element generates, according to the first data routing policy corresponding to the 5G LAN group 1, an N4 rule corresponding to the 5G LAN group 1.

For example, if the SMF network element determines that an identifier of a data flow of the UE 1 belongs to the identifier of the first data flow, the SMF network element determines that the UE 1 uses the N6-based forwarding manner. In this case, the SMF network element determines that a filter parameter of a PDR, in a group-level N4 session of the 5G LAN group 1, for the data flow of the UE 1 includes an address of the UE 1 or includes the data flow of the UE 1, to obtain the PDR for the group-level N4 session of the 5G LAN group 1. Then, the SMF network element sets a target interface of a FAR associated with the PDR for the group-level N4 session of the 5G LAN group 1 to a value corresponding to the N6 interface, to obtain a FAR of the group-level N4 session of the 5G LAN group 1; and sets a default PDR to support the N6-based forwarding manner, for example, sets a target interface of a FAR associated with the default PDR to a value corresponding to the N6 interface.

S609: The SMF network element sends an identifier of the N4 session of the 5G LAN group 1 and the N4 rule corresponding to the 5G LAN group 1 to each of a plurality of UPF network elements included in the 5G LAN group 1. The plurality of UPF network elements each receive the N4 rule corresponding to the 5G LAN group 1, and store the N4 rule in a corresponding N4 session.

Embodiment 2

Figure 7:
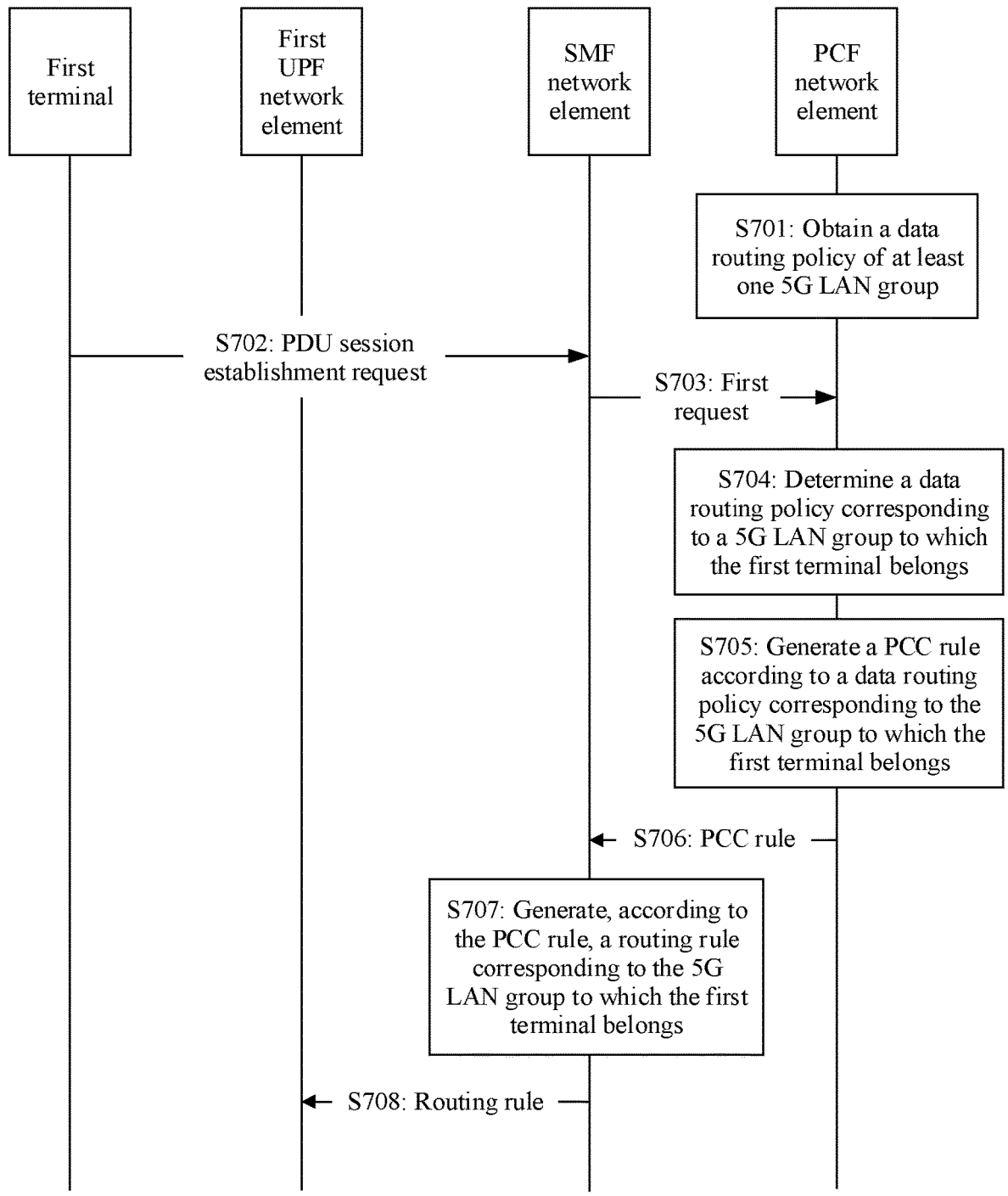
FIG. 7 is a flowchart of another example of a routing rule configuration method according to an embodiment of this application.

FIG. 7 is a flowchart of a routing rule configuration method according to an embodiment of this application. The flowchart is described as follows.

S701: A PCF network element obtains a data routing policy corresponding to at least one 5G LAN group.

The data routing policy corresponding to the 5G LAN group is similar to that in step S501, and details are not described herein again.

In this embodiment of this application, the PCF network element may obtain the data routing policy corresponding to the at least one 5G LAN group in any one of a plurality of manners described below.

In a first obtaining manner, the data routing policy corresponding to the at least one 5G LAN group is preconfigured on the PCF network element.

For example, when creating a 5G LAN group, an AF network element generates a data routing policy corresponding to each 5G LAN group. Then, an NEF network element configures the generated at least one data routing policy on the PCF network element.

In a second obtaining manner, the AF network element generates at least one data routing policy in the same manner as that in the first obtaining manner, and then configures the generated at least one data routing policy on a UDM/UDR network element through the NEF network element. The PCF network element obtains the at least one data routing policy from the UDM/UDR network element based on a use requirement.

The foregoing two obtaining manners are similar to the corresponding obtaining manners in step S501, and details are not described herein again.

S702: A first terminal sends a PDU session establishment request, and an SMF network element receives the PDU session establishment request.

For example, the PDU session establishment request carries a DNN that the PDU session needs to access. After receiving the PDU session establishment request, the SMF network element may determine whether the DNN is associated with a 5G LAN group. If the DNN is associated with the 5G LAN group, the SMF network element determines that the PDU session establishment request is used to create a PDU session of the first terminal to the 5G LAN group to which the first terminal belongs.

S703: The SMF network element sends a first request, and the PCF network element receives the first request.

In this embodiment of this application, the first request is used to obtain a PCC rule corresponding to the 5G LAN group to which the first terminal belongs. After determining that the PDU session establishment request is used to create a PDU session of the first terminal to the 5G LAN group to which the first terminal belongs, the SMF network element obtains an address of the first terminal and/or an identifier of the first terminal. Then, the SMF network element adds the DNN corresponding to the PDU session, and/or an identifier of the 5G LAN group to which the first terminal belongs, and/or an identifier of a UPF network element anchored to the PDU session of the first terminal to the first request, and sends the first request to the PCF network element.

S704: The PCF network element determines a data routing policy corresponding to the 5G LAN group to which the first terminal belongs.

After receiving the first request, the PCF network element determines, based on the DNN in the first request, and/or the identifier of the 5G LAN group to which the first terminal belongs, and/or the identifier of the UPF network element anchored to the first terminal, the 5G LAN group to which the first terminal belongs. Then, the data routing policy corresponding to the 5G LAN group to which the first terminal belongs is determined from the data routing policy corresponding to the at least one 5G LAN group.

S705: The PCF network element generates the PCC rule according to the data routing policy corresponding to the 5G LAN group to which the first terminal belongs.

In this embodiment of this application, the PCC rule includes information used to indicate to forward a data packet through an N6 interface. The information used to indicate to forward a data packet through the N6 interface may be a packet filter that supports an N6-based forwarding manner.

In this embodiment of this application, step S705 may include but is not limited to a plurality of cases in the following.

In a first case, if the data routing policy corresponding to the 5G LAN group to which the first terminal belongs includes information used to indicate that the 5G LAN group mandatorily supports the N6-based forwarding manner, the PCF network element determines that all flows of the 5G LAN group preferentially use the N6-based forwarding manner and then a local forwarding manner or an across-UPF forwarding manner. Therefore, the PCF network element generates a PCC rule corresponding to the N6-based forwarding manner, where the PCC rule includes the packet filter that supports the N6-based forwarding manner.

In an example, the PCC rule generated by the PCF network element includes a filter used to detect a data packet of the first terminal, that is, a filter that includes the address of the first terminal.

In a second case, if the data routing policy corresponding to the 5G LAN group to which the first terminal belongs includes information used to indicate that the 5G LAN group conditionally supports the N6-based forwarding manner, the PCF network element determines that all flows of the 5G LAN group preferentially use the local forwarding manner or the across-UPF network element forwarding manner, and then uses the N6-based forwarding manner.

In this case, the PCC rule includes a match-all packet filter.

In a third case, if the data routing policy corresponding to the 5G LAN group to which the first terminal belongs includes information used to indicate that the 5G LAN group does not support the N6-based forwarding manner, the PCF network element determines that all flows of the 5G LAN group use the local forwarding manner or the across-UPF network element forwarding manner, and does not use the N6-based forwarding manner.

In this case, the PCC rule does not include the packet filter.

In a fourth case, it is assumed that the data routing policy corresponding to the 5G LAN group to which the first terminal belongs includes information used to indicate that the 5G LAN group mandatorily supports the N6-based forwarding manner, and the data routing policy corresponding to the 5G LAN group to which the first terminal belongs includes an identifier of a first data flow that supports the N6-based forwarding manner or an identifier of at least one second terminal. In this case, the PCF network element determines that the first data flow of the 5G LAN group or the at least one second terminal preferentially uses the N6-based forwarding manner, and then uses the local forwarding manner or the across-UPF network element forwarding manner.

In this case, the PCF network element determines whether an identifier of a data flow of the first terminal belongs to the identifier of the first data flow, or determines whether the identifier of the at least one second terminal includes the identifier of the first terminal. If the identifier of the data flow of the first terminal belongs to the identifier of the first data flow, or the identifier of the at least one second terminal includes the identifier of the first terminal, the PCF network element determines that the first terminal supports the N6-based forwarding manner; otherwise, the PCF network element determines that the first terminal uses an N19-based forwarding manner or the local forwarding manner. If the PCF network element determines that the first terminal supports the N6-based forwarding manner, the PCC rule includes a filter used to detect a data packet of the first terminal, that is, a filter that includes the address of the first terminal.

In a fifth case, it is assumed that the data routing policy corresponding to the 5G LAN group to which the first terminal belongs includes information used to indicate that the 5G LAN group mandatorily supports the N6-based forwarding manner, and includes path information for forwarding a data packet in the N6-based forwarding manner. In this case, the PCF network element determines that all flows of the 5G LAN group preferentially use the N6-based forwarding manner and then uses the local forwarding manner or the across-UPF network element forwarding manner, where when the N6-based forwarding manner is used, a path indicated by the data routing policy corresponding to the 5G LAN group is used.

In this case, the PCC rule includes a packet filter that supports the N6-based forwarding manner and the path information for forwarding a data packet using the N6-based forwarding manner. The packet filter is the same as the packet filter in the first case, and details are not described herein again.

In a sixth case, it is assumed that the data routing policy corresponding to the 5G LAN group to which the first terminal belongs includes information used to indicate that the 5G LAN group conditionally supports the N6-based forwarding manner, and the path information for forwarding a data packet in the N6-based forwarding manner. In this case, the PCF network element determines that all flows of the 5G LAN group preferentially use the local forwarding manner or the across-UPF network element forwarding manner, and then use the N6-based forwarding manner, where when the N6-based forwarding manner is used, the path indicated by the data routing policy corresponding to the 5G LAN group is used.

In this case, the PCC rule includes a packet filter that supports the N6-based forwarding manner and the path information for forwarding a data packet using the N6-based forwarding manner. The packet filter is the same as the packet filter in the second case, and details are not described herein again.

A seventh case is a combination of the fourth case and the fifth case, and details are not described herein again.

In an eighth case, because the 5G LAN group may further support the local forwarding manner or the N19-based forwarding manner, the PCF network element may further determine a correspondence between the address of the first terminal and the UPF network element, and generate a packet filter corresponding to the local forwarding manner or the N19-based forwarding manner. A generation manner is similar to a manner of generating a packet filter using the N6-based forwarding manner, and details are not described herein again.

S706: The PCF network element sends the PCC rule, and the SMF network element receives the PCC rule.

S707: The SMF network element generates, according to the PCC rule, the routing rule corresponding to the 5G LAN group to which the first terminal belongs.

In this embodiment of this application, step S707 includes but is not limited to the following implementations.

In a first implementation, if the packet filter is for a specified quality of service flow or a specified terminal, for example, the specified quality of service flow and the specified terminal are respectively corresponding to the first case and the fourth case in step S705, the SMF network element sets, to a packet filter indicated by the PCC rule, a filter parameter of a PDR for a specific data flow in a group-level N4 session of the 5G LAN group, to obtain a PDR 1 (namely, a fourth PDR). Then, the SMF network element sets a target interface of a FAR 1 associated with the PDR 1 to a value corresponding to the N6 interface, to obtain a FAR 1 (namely, a fourth FAR); and sets a default PDR to support the N6-based forwarding manner, for example, sets a target interface of a FAR associated with the default PDR to a value corresponding to the N6 interface.

In a second implementation, if the packet filter is a match-all packet filter, for example, the specified quality of service flow and the specified terminal are respectively corresponding to the second case and the fifth case in step S705, the SMF network element sets a target interface of a FAR that is in the group-level N4 session of the 5G LAN group and that is associated with a default PDR for a quality of service flow to a value corresponding to the N6 interface, to obtain a FAR 2 (namely, a fifth FAR). The default PDR for the quality of service flow is a PDR 2 (namely, a fifth PDR). In addition, the SMF network element configures the PDR for a specific data flow in the group-level N4 session of the 5G LAN group to support the across-UPF forwarding manner, or in an N4 session corresponding to a PDU session to support the local forwarding manner.

In a third implementation, if the PCC rule doesn't include a packet filter, for example, the specified quality of service flow and the specified terminal are respectively corresponding to the third case and the sixth case in step S705, the SMF network element sets a discard indication in the FAR that is in the group-level N4 session of the 5G LAN group and that is associated with the default PDR for a quality of service flow. In this case, the default PDR for a quality of service flow is a PDR 3 (namely, a sixth PDR), and the FAR that includes the discard indication is a FAR 3 (namely, a sixth FAR). In addition, the SMF network element configures the PDR for a specific data flow in the group-level N4 session of the 5G LAN group to support the across-UPF forwarding manner, or in the N4 session corresponding to a PDU session to support the local forwarding manner.

For the first implementation and the second implementation, if the PCC rule further includes the path information for forwarding a data packet using the N6-based forwarding manner, the SMF network element may indicate the path information in a fourth FAR or the fifth FAR.

In a fourth implementation, if the PCC rule further includes a packet filter that supports the local forwarding manner, the SMF may set an N4 rule that supports the local forwarding manner in the N4 session corresponding to a PDU session. A filtering parameter of a PDR in the N4 rule is a packet filter that supports the local forwarding manner.

In a fifth implementation, if the PCC rule further includes a packet filter that supports across-UPF forwarding, the SMF may set an N4 rule that supports the across-UPF forwarding in the group-level N4 session in the 5G LAN group. A filtering parameter of a PDR in the N4 rule is a packet filter that supports the across-UPF forwarding.

In addition, it should be noted that if the PCC rule does not include a packet filter that supports the local forwarding manner and a packet filter that supports the across-UPF forwarding, the SMF may generate a corresponding routing rule in the group-level N4 session corresponding to the 5G LAN group or in the N4 session corresponding to a PDU session in the manner shown in FIG. 5. Details are not described herein again.

S708: The SMF network element sends the routing rule to the first UPF network element, and the first UPF network element receives the routing rule and configures the routing rule on the UPF network element.

Step S708 is similar to step S504, and details are not described herein again.

In the foregoing technical solution, the PCF network element generates the corresponding PCC rule according to the data routing policy corresponding to the 5G LAN group, and then sends the PCC rule to the SMF network element, such that the SMF network element may directly generate the corresponding N4 rule according to the PCC rule. Compared with Embodiment 1, Embodiment 2 can reduce a calculation amount of the SMF network element and reduce load of the SMF network element.

Figure 8:
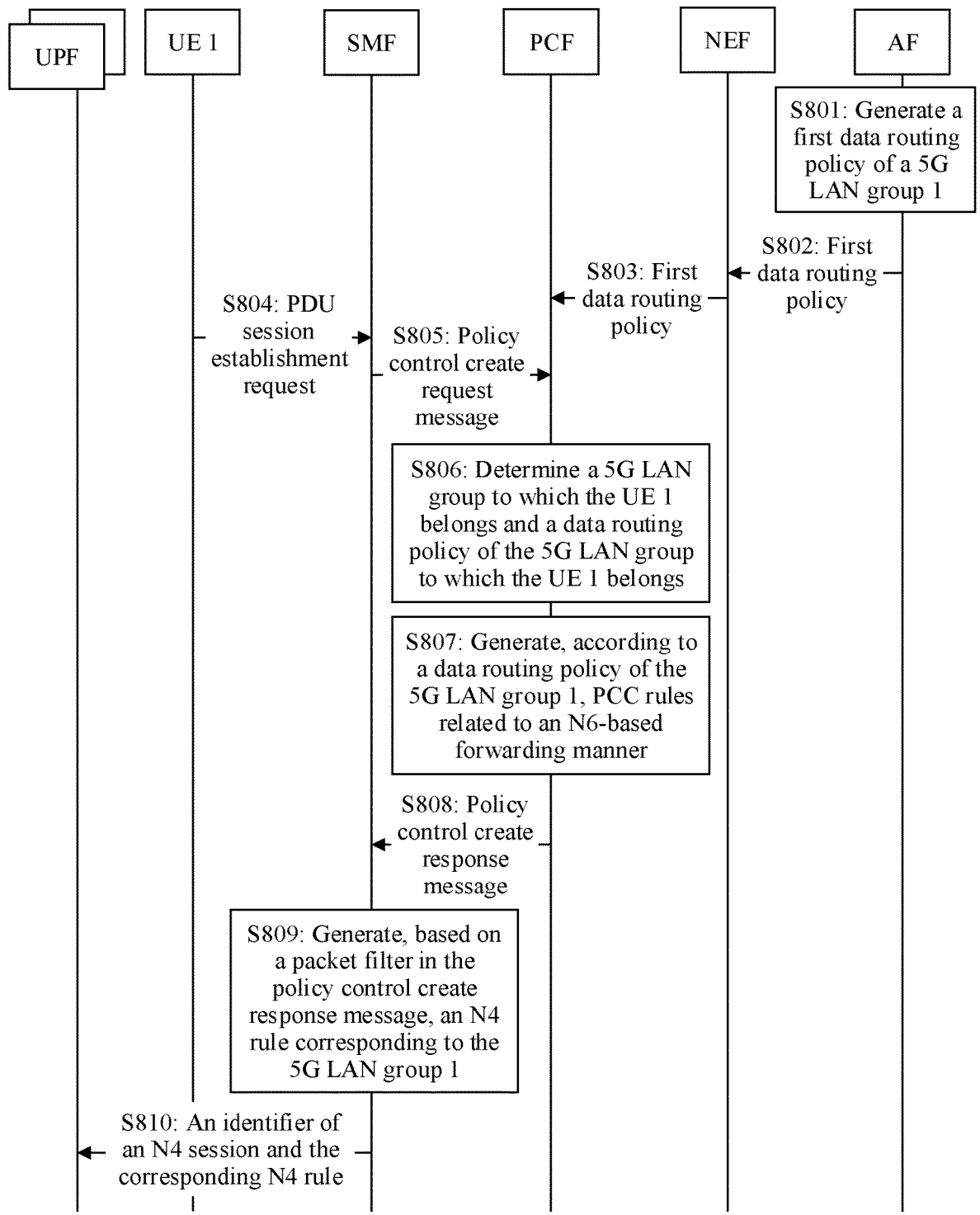
FIG. 8 is a flowchart of another example of a routing rule configuration manner according to an embodiment of this application.

Based on a same concept, an embodiment of this application further provides a management method in LAN communication. The method may be considered an example of the method shown in FIG. 7. FIG. 8 is a method flowchart of this example. The method flowchart is described as follows.

S801: An AF network element generates a first data routing policy corresponding to a 5G LAN group 1.

The first data routing policy includes an identifier of the 5G LAN group 1, an N6-based forwarding manner mandatorily supported by the 5G LAN group 1, and an identifier of a first data flow that supports the N6-based forwarding manner.

S802: The AF network element sends the first data routing policy to an NEF network element, and the NEF network element receives and stores the first data routing policy.

S803: The NEF network element sends the first data routing policy to a PCF network element, and the PCF network element receives the first data routing policy.

S804: A UE 1 sends a PDU session establishment request to an SMF network element, and the SMF network element receives the PDU session establishment request.

S805: The SMF network element sends a policy control create request (Npcf_AMPolicyControl_Create Req) message, and the PCF network element receives the Npcf_AMPolicyControl_Create Req message.

For example, the Npcf_AMPolicyControl_Create Req message carries at least one of the following information: a DNN corresponding to a PDU session, an identifier of a 5G LAN group to which the PDU session belongs, an identifier of the UE 1, or an address of the UE 1.

S806: The PCF network element determines a 5G LAN group to which the UE 1 belongs and a data routing policy corresponding to the 5G LAN group to which the UE 1 belongs.

For example, the PCF network element may determine, based on a message carried in the Npcf_AMPolicyControl_Create Req message, the 5G LAN group to which the UE 1 belongs. For example, if the Npcf_AMPolicyControl_Create Req message carries the DNN corresponding to the PDU session, the PCF network element determines whether the DNN is associated with the 5G LAN group 1. If the DNN is associated with the 5G LAN group 1, the PCF network element determines that the UE 1 belongs to the 5G LAN group 1.

Then, the PCF network element determines the data routing policy corresponding to the 5G LAN group 1 from a data routing policy corresponding to at least one 5G LAN group.

S807: The PCF network element generates, according to the data routing policy corresponding to the 5G LAN group 1, PCC rules related to the N6-based forwarding manner.

For example, the 5G LAN group 1 mandatorily supports the N6-based forwarding manner. If the PCF network element determines that an identifier of a first data flow includes an identifier of a data flow of the UE 1, the PCF network element determines that the UE 1 uses the N6-based forwarding manner. In this case, a packet filter included in the PCC rule is a filter for detecting a data packet of a first terminal, that is, the filter includes an address of the first terminal.

S808: The PCF network element sends a policy control create response (Npcf_AMPolicyControl_Create Rsp) message, and the SMF network element receives the Npcf_AMPolicyControl_Create Rsp message.

The Npcf_AMPolicyControl_Create Rsp message includes a packet filter corresponding to the N6-based forwarding manner.

S809: The SMF network element generates, based on a packet filter in the Npcf_AMPolicyControl_Create Rsp message, an N4 rule corresponding to the 5G LAN group 1.

For example, the SMF network element sets, to a packet filter indicated by the PCC rule, a filter parameter of a PDR for a specific data flow in a group-level N4 session of the 5G LAN group; and sets a target interface of a FAR associated with the PDR to a value corresponding to the N6 interface, to obtain the N4 rule corresponding to the 5G LAN group 1.

S810: The SMF network element sends an identifier of the N4 session of the 5G LAN group 1 and the N4 rule corresponding to the 5G LAN group 1 to each of a plurality of UPF network elements included in the 5G LAN group 1. The plurality of UPF network elements each receive the N4 rule corresponding to the 5G LAN group 1, and store the N4 rule in a corresponding N4 session.

In the foregoing embodiments provided in this application, the methods provided in the embodiments of this application are separately described from a perspective of interaction between the session management function network element and the policy control function network element. To implement the functions in the methods provided in the embodiments of this application, the session management function network element and the policy control function network element may include a hardware structure and/or a software module, and implement the foregoing functions in a form of a hardware structure, a software module, or a combination of a hardware structure and a software module. Whether one of the foregoing functions is performed by the hardware structure, the software module, or the combination of the hardware structure and the software module depends on particular applications and design constraints of the technical solutions.

Figure 9:
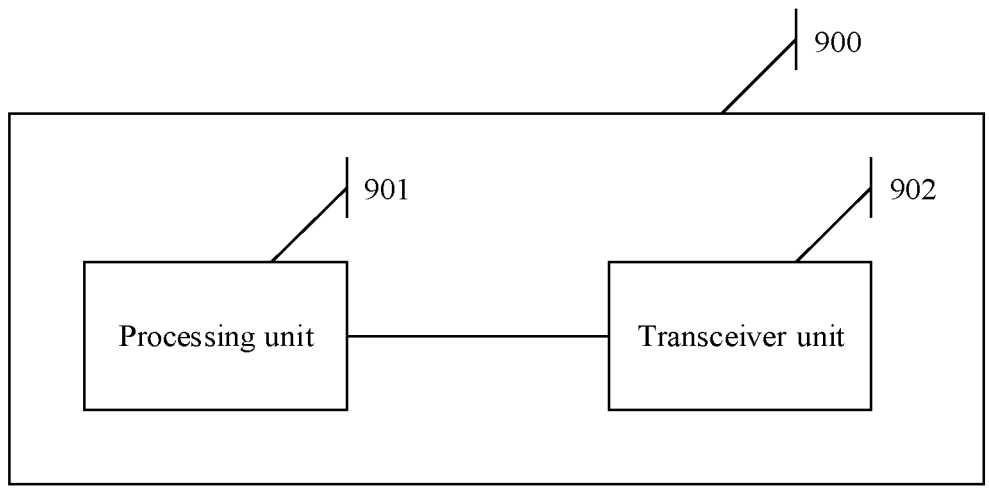
FIG. 9 is a schematic diagram of a structure of a communications apparatus according to an embodiment of this application.

FIG. 9 is a schematic diagram of a structure of a communications apparatus 900. The communications apparatus 900 may be a session management function network element, and can implement a function of the session management function network element in the method provided in the embodiments of this application. Alternatively, the communications apparatus 900 may be an apparatus that can support the session management function network element in implementing a function of the session management function network element in the method provided in the embodiments of this application. The communications apparatus 900 may be a hardware structure, a software module, or a combination of a hardware structure and a software module. The communications apparatus 900 may be implemented by a chip system. In this embodiment of this application, the chip system may include a chip, or may include a chip and another discrete component.

The communications apparatus 900 may include a processing unit 901 and a transceiver unit 902.

The processing unit 901 may be configured to perform step S501 and S503 in the embodiment shown in FIG. 5, steps S607 and S608 in the embodiment shown in FIG. 6, step S707 in the embodiment shown in FIG. 7, or step S809 in the embodiment shown in FIG. 8; and/or configured to support another process of the technology described in this specification.

The transceiver unit 902 is used by the communications apparatus 900 to communicate with another module, and may be a circuit, a component, an interface, a bus, a software module, a transceiver, or any other apparatus that can implement communication.

The transceiver unit 902 may be configured to perform steps S502 and S504 in the embodiment shown in FIG. 5, steps S605, S606, and S609 in the embodiment shown in FIG. 6, steps S702, S703, S706, and S708 in the embodiment shown in FIG. 7, or steps S804, S805, S808, and S810 in the embodiment shown in FIG. 8; and/or configured to support another process of the technology described in this specification.

All related content of the steps in the foregoing method embodiments may be cited in function descriptions of the corresponding functional modules. Details are not described herein again.

Figure 10:
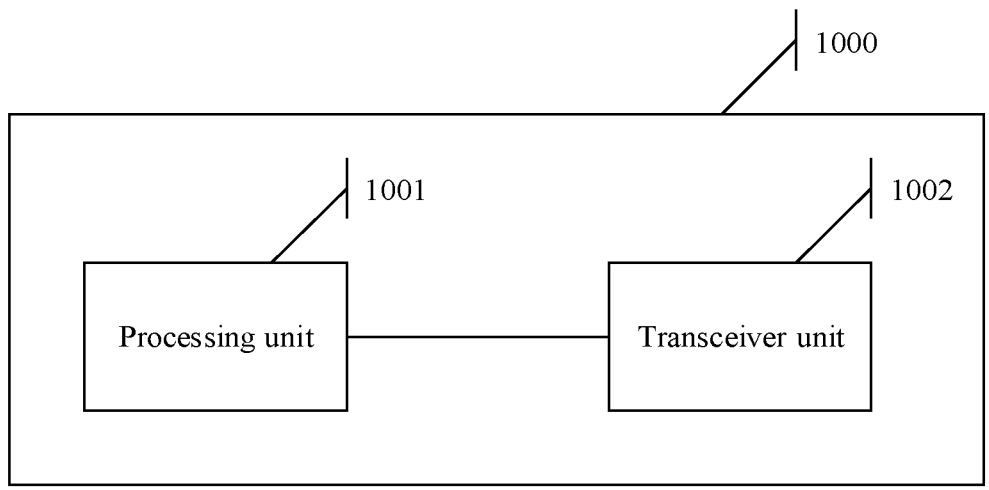
FIG. 10 is a schematic diagram of a structure of another communications apparatus according to an embodiment of this application.

FIG. 10 is a schematic diagram of a structure of a communications apparatus 1000. The communications apparatus 1000 may be a policy control function network element, and can implement a function of the policy control function network element in the method provided in the embodiments of this application. Alternatively, the communications apparatus 1000 may be an apparatus that can support the policy control function network element in implementing a function of the policy control function network element in the method provided in the embodiments of this application. The communications apparatus 1000 may be a hardware structure, a software module, or a combination of a hardware structure and a software module. The communications apparatus 1000 may be implemented by a chip system. In this embodiment of this application, the chip system may include a chip, or may include a chip and another discrete component.

The communications apparatus 1000 may include a processing unit 1001 and a transceiver unit 1002.

The processing unit 1001 may be configured to perform step S604 in the embodiment shown in FIG. 6, steps S701, S704, and S705 in the embodiment shown in FIG. 7, or steps S806 and S807 in the embodiment shown in FIG. 8; and/or configured to support another process of the technology described in this specification.

The transceiver unit 1002 is used by the communications apparatus 1000 to communicate with another module, and may be a circuit, a component, an interface, a bus, a software module, a transceiver, or any other apparatus that can implement communication.

The transceiver unit 1002 may be configured to perform steps S603 and S605 in the embodiment shown in FIG. 6, steps S703 and S706 in the embodiment shown in FIG. 7, or steps S803, S805, and S808 in the embodiment shown in FIG. 8, and/or configured to support another process of the technology described in this specification.

All related content of the steps in the foregoing method embodiments may be cited in function descriptions of the corresponding functional modules. Details are not described herein again.

Figure 11:
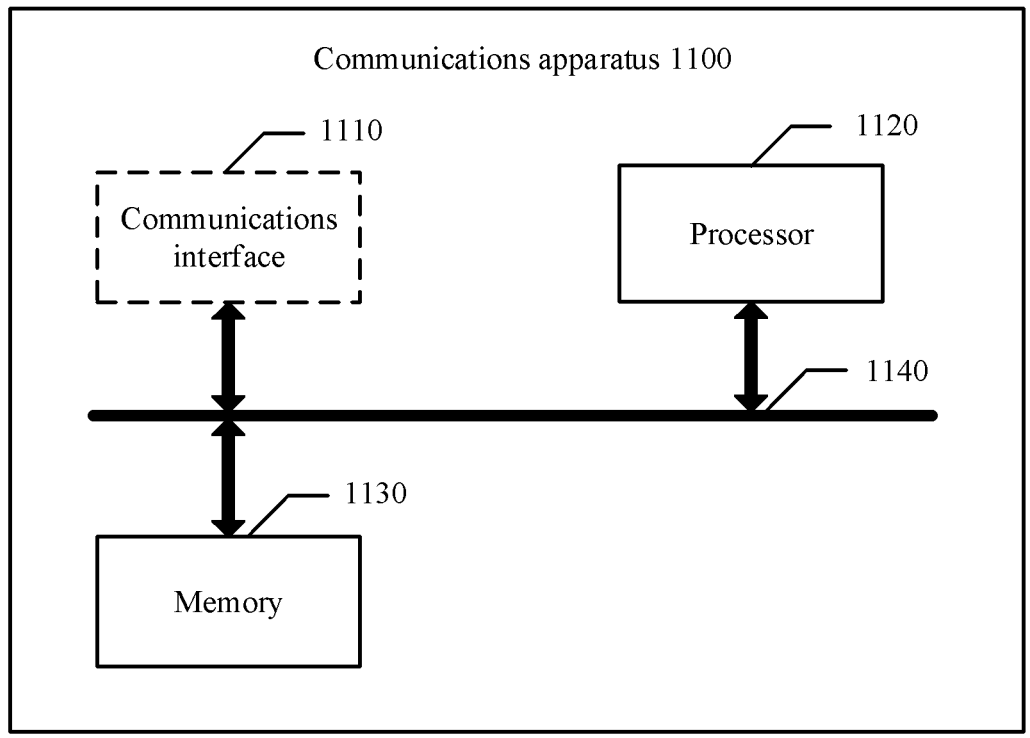
FIG. 11 is a schematic diagram of a structure of another communications apparatus according to an embodiment of this application.

FIG. 11 shows a communications apparatus 1100 according to an embodiment of this application. The communications apparatus 1100 may be a session management function network element, and can implement a function of the session management function network element in the method provided in the embodiments of this application. Alternatively, the communications apparatus 1100 may be an apparatus that can support the session management function network element in implementing a function of the session management function network element in the method provided in the embodiments of this application. The communications apparatus 1100 may be a chip system. In this embodiment of this application, the chip system may include a chip, or may include a chip and another discrete component.

In hardware implementation, the transceiver unit 902 may be a transceiver, and the transceiver is integrated into the communications apparatus 1100 as a communications interface 1110.

The communications apparatus 1100 includes at least one processor 1120 configured to implement or support the communications apparatus 1100 in implementing a function of the session management function network element in the method provided in the embodiments of this application. For example, the processor 1120 may generate a routing rule corresponding to a 5G LAN group to which a first terminal belongs. For details, refer to the detailed descriptions in the method example. Details are not described herein again.

The communication apparatus 1100 may further include at least one memory 1130 configured to store program instructions and/or data. The memory 1130 is coupled to the processor 1120. Coupling in this embodiment of this application may be indirect coupling or a communication connection between apparatuses, units, or modules in an electrical form, a mechanical form, or another form, and is used for information exchange between the apparatuses, the units, or the modules. The processor 1120 may cooperate with the memory 1130. The processor 1120 may execute the program instructions stored in the memory 1130. At least one memory of the at least one memory 1130 may be included in the processor 1120.

The communication apparatus 1100 may further include the communications interface 1110 configured to communicate with another device using a transmission medium, such that an apparatus in the apparatus 1100 can communicate with another device. For example, the other device may be a policy control function network element. The processor 1120 may send and receive data through the communications interface 1110. The communications interface 1110 may be a transceiver.

In this embodiment of this application, a specific connection medium among the communications interface 1110, the processor 1120, and the memory 1130 is not limited. In this embodiment of this application, the memory 1130, the processor 1120, and the communications interface 1110 are connected through a bus 1140 in FIG. 11. The bus is represented using a thick line in FIG. 11. Such a manner of connection between components is merely an example for description, and imposes no limitation. The bus may be classified into an address bus, a data bus, a control bus, and the like. For ease of representation, only one thick line is used to represent the bus in FIG. 11, but this does not mean that there is only one bus or only one type of bus.

In this embodiment of this application, the processor 1120 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed using a combination of hardware in the processor and a software module.

In this embodiment of this application, the memory 1130 may be a non-volatile memory, for example, a hard disk drive (HDD) or a solid-state drive (SSD), or may be a volatile memory, for example, a random access memory (RAM). The memory 1130 is any other medium that can be used to carry or store expected program code in a form of an instruction or a data structure and that is accessible to a computer, but is not limited thereto. The memory 1130 in this embodiment of this application may alternatively be a circuit or any other apparatus that can implement a storage function, and is configured to store a program instruction and/or data.

Figure 12:
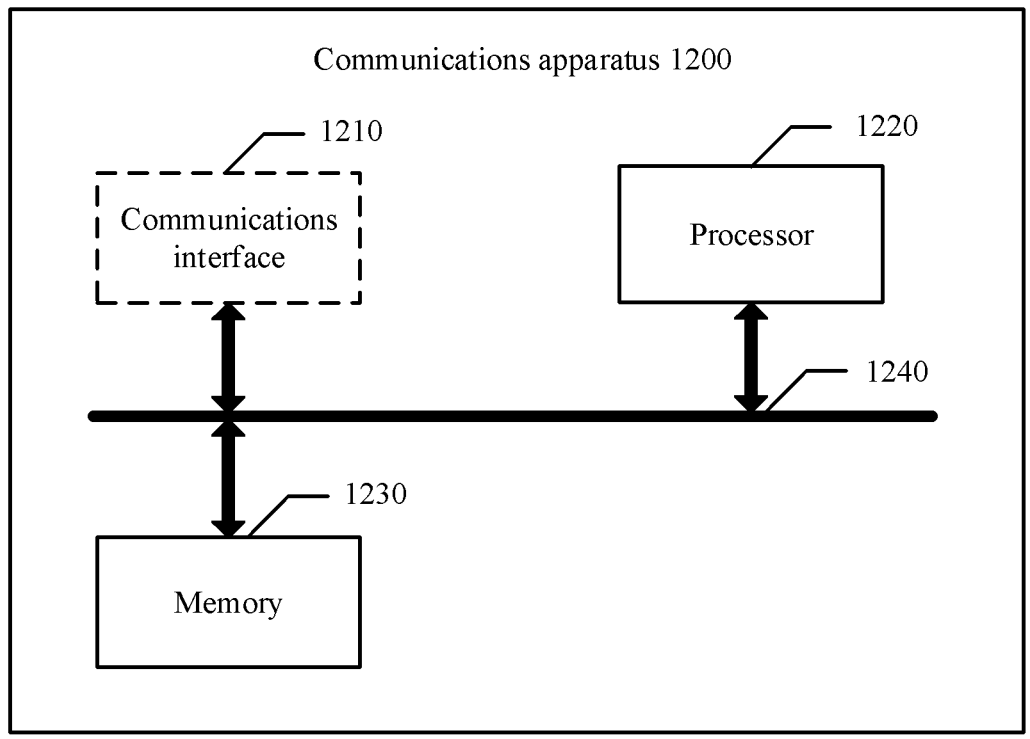
FIG. 12 is a schematic block diagram of another communications apparatus according to an embodiment of this application.

FIG. 12 shows a communications apparatus 1200 according to an embodiment of this application. The communications apparatus 1200 may be a policy control function network element, and can implement a function of the policy control function network element in the method provided in the embodiments of this application. Alternatively, the communications apparatus 1200 may be an apparatus that can support the policy control function network element in implementing a function of the policy control function network element in the method provided in the embodiments of this application. The communications apparatus 1200 may be a chip system. In this embodiment of this application, the chip system may include a chip, or may include a chip and another discrete component.

In hardware implementation, the transceiver unit 1002 may be a transceiver, and the transceiver is integrated into the communications apparatus 1200 as a communications interface 1210.

The communications apparatus 1200 includes at least one processor 1220 configured to implement or support the communications apparatus 1200 in implementing a function of the policy control function network element in the method provided in the embodiments of this application. For example, the processor 1220 may generate a PCC rule according to a data routing policy corresponding to a 5G LAN group to which a first terminal belongs. For details, refer to the detailed descriptions in the method example. Details are not described herein again.

The communication apparatus 1200 may further include at least one memory 1230 configured to store program instructions and/or data. The memory 1230 is coupled to the processor 1220. Coupling in this embodiment of this application may be indirect coupling or a communication connection between apparatuses, units, or modules in an electrical form, a mechanical form, or another form, and is used for information exchange between the apparatuses, the units, or the modules. The processor 1220 may cooperate with the memory 1230. The processor 1220 may execute the program instructions stored in the memory 1230. At least one of the at least one memory may be included in the processor.

The communication apparatus 1200 may further include the communications interface 1210 configured to communicate with another device using a transmission medium, such that an apparatus in the apparatus 1200 can communicate with another device. For example, the other device may be a terminal. The processor 1220 may send and receive data through the communications interface 1210. The communications interface 1210 may be a transceiver.

In this embodiment of this application, a specific connection medium among the communications interface 1210, the processor 1220, and the memory 1230 is not limited. In this embodiment of this application, the memory 1230, the processor 1220, and the communications interface 1210 are connected through a bus 1240 in FIG. 12. The bus is represented using a thick line in FIG. 12. Such a manner of connection between components is merely an example for description, and imposes no limitation. The bus may be classified into an address bus, a data bus, a control bus, and the like. For ease of representation, only one thick line is used to represent the bus in FIG. 12, but this does not mean that there is only one bus or only one type of bus.

In this embodiment of this application, the processor 1220 may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed using a combination of hardware in the processor and a software module.

In this embodiment of this application, the memory 1230 may be a non-volatile memory, for example, a hard disk drive (HDD) or a solid-state drive (SSD), or may be a volatile memory (volatile memory), for example, a random-access memory (RAM). The memory 1230 is any other medium that can be used to carry or store expected program code in a form of an instruction or a data structure and that is accessible to a computer, but is not limited thereto. The memory 1230 in this embodiment of this application may alternatively be a circuit or any other apparatus that can implement a storage function, and is configured to store a program instruction and/or data.

Figure 13:
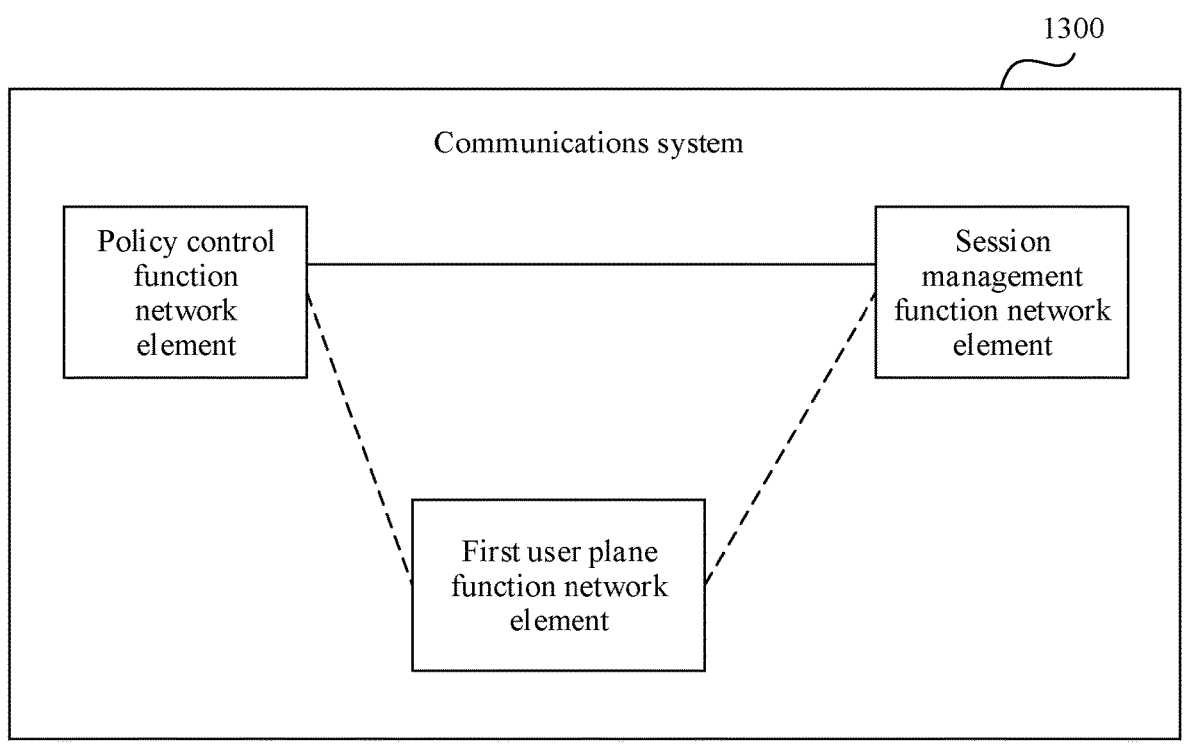
FIG. 13 is a schematic block diagram of a communications system according to an embodiment of this application.

FIG. 13 is a schematic diagram of a structure of a communications system 1300 according to an embodiment of this application. For example, a communications system 1300 includes a session management function network element and a policy control function network element. Optionally, the communications system 1300 may further include a first UPF network element.

The session management function network element and the policy control function network element are respectively configured to implement functions of related network elements in FIG. 5 to FIG. 8. For details, refer to related descriptions in the method embodiments. Details are not described herein again.

An embodiment of this application further provides a computer-readable storage medium, including instructions. When the instructions are run on a computer, the computer is enabled to perform the methods performed by the session management function network element and the policy control function network element in FIG. 5 to FIG. 8.

An embodiment of this application further provides a computer program product, including instructions. When the instructions are run on a computer, the computer is enabled to perform the methods performed by the session management function network element and the policy control function network element in FIG. 5 to FIG. 8.

An embodiment of this application provides a chip system. The chip system includes a processor, and may further include a memory configured to implement functions of the session management function network element and the policy control function network element in the foregoing methods. The chip system may include a chip, or may include a chip and another discrete component.

All or some of the methods in the embodiments of this application may be implemented using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, all or some of the procedures or the functions according to the embodiments of the present disclosure are generated. The computer may be a general-purpose computer, a dedicated computer, a computer network, a network device, user equipment, or another programmable apparatus. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD for short)), a semiconductor medium (for example, an SSD), or the like.

Clearly, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A method, comprising:
receiving, from a first terminal, a session establishment request comprising a data network name (DNN);
determining, based on the DNN, a local area network (LAN) group to which the first terminal belongs;
generating, based on first information indicating whether a forwarding manner of a data packet for the LAN group through a data network is used, a routing rule indicating to forward the data packet, that does not match any packet detection rule (PDR) for a specific data flow, through the data network or discard the data packet, wherein the routing rule corresponds to the LAN group; and
configuring the routing rule on a first user plane function network element providing a service for the LAN group.

2. The method of claim 1, wherein the forwarding manner is an N6-based forwarding manner, and wherein the first information is a data routing policy indicating whether the N6-based forwarding manner is used for the LAN group.

3. The method of claim 1, wherein the first information is preconfigured on a session management function network element configured to perform the method.

4. The method of claim 1, wherein the routing rule is for a group-level N4 session of the LAN group.

5. The method of claim 1, further comprising configuring a first rule for a first specific data flow in a group-level N4 session of the LAN group for supporting an across-user plane function forwarding manner.

6. The method of claim 1, wherein the session establishment request is for creating a protocol data unit (PDU) session for the first terminal, and wherein the method further comprises configuring a second rule for a second specific data flow in an N4 session corresponding to the PDU session for supporting a local forwarding manner.

7. The method of claim 1, wherein generating the routing rule comprises generating, based on the first information indicating that the forwarding manner through the data network is not used, the routing rule indicating to discard the data packet.

8. The method of claim 7, wherein the routing rule comprises a first PDR and a first forwarding action rule (FAR) corresponding to the first PDR, wherein the first FAR indicates to discard a data packet matching the first PDR, and wherein the first PDR comprises a match-all packet filter and is for an unmatched data flow that does not match any other PDR.

9. The method of claim 1, wherein generating the routing rule comprises generating, based on the first information indicating that the forwarding manner through the data network is used, the routing rule indicating to forward the data packet through the data network.

10. The method of claim 9, wherein the routing rule comprises a second PDR and a second forwarding action rule (FAR) corresponding to the second PDR, wherein the second PDR comprises a match-all packet filter and is for an unmatched data flow that does not match any other PDR, and wherein a target interface of the second FAR is a value corresponding to an N6 interface.

11. The method of claim 1, wherein the method further comprises receiving, by the first user plane function network element, the routing rule.

12. An apparatus, comprising:
at least one processor; and
a memory coupled to the processor and configured to store program instructions, which when executed by the at least one processor, cause the apparatus to:
receive, from a first terminal, a session establishment request comprising a data network name (DNN);
determine, based on the DNN, a local area network (LAN) group to which the first terminal belongs;
generate, based on first information indicating whether a forwarding manner of a data packet for the LAN group through a data network is used, a routing rule indicating to forward the data packet, that does not match any packet detection rule (PDR) for a specific data flow, through the data network or discard the data packet, wherein the routing rule corresponds to the LAN group; and
configure the routing rule on a first user plane function network element providing a service for the LAN group.

13. The apparatus of claim 12, wherein the forwarding manner is an N6-based forwarding manner, and wherein the first information is a data routing policy indicating whether the N6-based forwarding manner is used for the LAN group.

14. The apparatus of claim 12, wherein the first information is preconfigured on the apparatus.

15. The apparatus of claim 12, wherein the program instructions further cause the apparatus to configure a first rule for a first specific data flow in a group-level N4 session of the LAN group for supporting an across-user plane function forwarding manner.

16. The apparatus of claim 12, wherein the session establishment request is for creating a protocol data unit (PDU) session for the first terminal, and wherein the program instructions further cause the apparatus to configure a second rule for a second specific data flow in an N4 session corresponding to the PDU session.

17. The apparatus of claim 12, wherein the routing rule is for a group-level N4 session of the LAN group.

18. The apparatus of claim 12, wherein the program instructions further cause the apparatus to generate based on the first information indicating that the forwarding manner through the data network is not used, the routing rule indicating to discard the data packet.

19. The apparatus of claim 18, wherein the routing rule comprises a first PDR and a first forwarding action rule (FAR) corresponding to the first PDR, wherein the first FAR indicates to discard a data packet matching the first PDR, and wherein the first PDR comprises a match-all packet filter and is for an unmatched data flow that does not match any other PDR.

20. The apparatus of claim 12, wherein the program instructions further cause the apparatus to generate, based on the first information indicating that the forwarding manner through the data network is used, the routing rule indicating to forward the data packet through the data network.

21. The apparatus of claim 20, wherein the routing rule comprises a second PDR and a second forwarding action rule (FAR) corresponding to the second PDR, wherein the second PDR comprises a match-all packet filter and is for an unmatched data flow that does not match any PDR, and wherein a target interface of the second FAR is a value corresponding to an N6 interface.

22. The apparatus of claim 12, wherein the program instructions further cause the apparatus to receive, by the first user plane function network element, the routing rule.

23. A computer program product comprising instructions that are stored on a non-transitory computer medium and that, when executed by a processor of an apparatus, cause the apparatus to:
  receive, from a first terminal, a session establishment request comprising a data network name (DNN);
  determine, based on the DNN, a local area network (LAN) group to which the first terminal belongs;
  generate, based on first information indicating whether a forwarding manner of a data packet for the LAN group through a data network is used, a routing rule indicating to forward the data packet, that does not match any packet detection rule (PDR) for a specific data flow, through the data network or discard the data packet, wherein the routing rule corresponds to the LAN group; and
  configure the routing rule on a first user plane function network element providing a service for the LAN group.

24. The computer program product of claim 23, wherein the processor is further configured to execute the instructions to cause the apparatus to receive, by the first user plane function network element, the routing rule.

* * * * *